(12) United States Patent
Kumano et al.

(10) Patent No.: US 11,404,041 B2
(45) Date of Patent: Aug. 2, 2022

(54) AUDIO GUIDANCE GENERATION DEVICE, AUDIO GUIDANCE GENERATION METHOD, AND BROADCASTING SYSTEM

(71) Applicants: NIPPON HOSO KYOKAI, Tokyo (JP); NHK Engineering System, Inc., Tokyo (JP)

(72) Inventors: Tadashi Kumano, Tokyo (JP); Ichiro Yamada, Tokyo (JP); Atsushi Imai, Kawasaki (JP); Hideki Sumiyoshi, Kawasaki (JP); Yuko Yamanouchi, Tokyo (JP); Toshihiro Shimizu, Tokyo (JP); Nobumasa Seiyama, Tokyo (JP); Shoei Sato, Kawasaki (JP); Reiko Saito, Tokyo (JP); Taro Miyazaki, Tokyo (JP); Kiyoshi Kurihara, Tokyo (JP); Manon Ichiki, Tokyo (JP); Tohru Takagi, Tokyo (JP)

(73) Assignees: NIPPON HOSO KYOKAI, Tokyo (JP); NHK Engineering System, Inc., Tokyo (JP)

( * ) Notice: Subject to any disclaimer, the term of this patent is extended or adjusted under 35 U.S.C. 154(b) by 166 days.

(21) Appl. No.: 16/611,276

(22) PCT Filed: May 23, 2018

(86) PCT No.: PCT/JP2018/019828
§ 371 (c)(1),
(2) Date: Nov. 6, 2019

(87) PCT Pub. No.: WO2018/216729
PCT Pub. Date: Nov. 29, 2018

(65) Prior Publication Data
US 2020/0066251 A1 Feb. 27, 2020

(30) Foreign Application Priority Data
May 24, 2017 (JP) .............................. JP2017-102847

(51) Int. Cl.
*G10L 13/00* (2006.01)
*G10L 15/00* (2013.01)
(Continued)

(52) U.S. Cl.
CPC ............ *G10L 13/00* (2013.01); *G10L 15/005* (2013.01); *G10L 15/02* (2013.01); *G10L 15/26* (2013.01); *G10L 2015/025* (2013.01)

(58) Field of Classification Search
CPC ......... G10L 13/10; G10L 13/00; G10L 13/08; G10L 15/005; G10L 15/02; G10L 15/26;
(Continued)

(56) References Cited

U.S. PATENT DOCUMENTS 9,431,002 B2 * 8/2016 Panguluri ............... G10L 13/08
2007/0190979 A1 8/2007 Hatano
(Continued)

FOREIGN PATENT DOCUMENTS

JP H07-199992 A 8/1995
JP 2001-282268 A 10/2001
(Continued)

OTHER PUBLICATIONS

Murakami et al ("Automatic generation of real-time report on inning from batter's performance," The Association for Natural Language Processing, 22nd Annual Meeting, Mar. 2016 (Year: 2016).*
(Continued)

*Primary Examiner* — Angela A Armstrong
(74) *Attorney, Agent, or Firm* — Faegre Drinker Biddle & Reath LLP

(57) ABSTRACT

A message management unit receives and accumulates a message, wherein the message is distributed for every update, is the message data representing a latest situation of a competition, an explanation generation unit generates an
(Continued)

explanatory text for conveying unconveyed information detected from the message, based on conveyed information, a speech synthesis unit outputs a speech converted from the explanatory text, wherein the explanation generation unit stores the unconveyed information for the explanatory text as the conveyed information, stands by until completion of completion of the speech, and initiates a procedure for generating a new explanatory text based on updated unconveyed information.

9 Claims, 19 Drawing Sheets

(51) Int. Cl.
  *G10L 15/02* (2006.01)
  *G10L 15/26* (2006.01)
(58) Field of Classification Search
  CPC ........ G10L 2013/105; G10L 2015/025; H04N 21/2187; H04N 21/2368; H04N 21/4884; H04N 21/8106; H04N 21/20
  See application file for complete search history.

(56) References Cited

U.S. PATENT DOCUMENTS

| | | | |
|---|---|---|---|
| 2012/0210348 A1 | 8/2012 | Verna et al. | |
| 2012/0330666 A1 | 12/2012 | Verna et al. | |
| 2013/0253926 A1* | 9/2013 | Takahashi | G10L 13/04 704/235 |
| 2015/0382079 A1* | 12/2015 | Lister | H04N 21/4884 725/38 |
| 2018/0077440 A1* | 3/2018 | Wadhera | H04N 21/26283 |

FOREIGN PATENT DOCUMENTS

| | | |
|---|---|---|
| JP | 2003-24626 A | 1/2003 |
| JP | 2008-40419 A | 2/2008 |
| WO | WO-2006/022075 A1 | 3/2006 |

OTHER PUBLICATIONS

Sato et al., "A System Verification for Automatic Speech Guidance for Sports Broadcasts", IPSJ SIG Technical Report, Oct. 2016, vol. 2016-SLP-113, No. 6, p. 1-6 (Notice of Allowance and English translation serves as relevance).

Notice of Allowance with English Language Translation dated Dec. 15, 2020, issued in JP patent application No. 2019-520285 (5 pages).

Murakami, Shoichiro et al., "Automatic generation of real-time report on inning from batter's performance," The Association for Natural Language Processing, The 22nd Annual Meeting, Presentation (Mar. 2016).

International Search Report dated Aug. 7, 2018 for PCT/JP2018/019828.

* cited by examiner

FIG. 3

```
MESSAGE TYPE: GAME STATE
GAME: SOCCER MEN'S FINAL,
   ⋮
BATTLE CARD [TEAM 1]: BRAZIL,
BATTLE CARD [TEAM 2]: GERMANY,
   ⋮
SCORE [TEAM 1]: 3,
SCORE [TEAM 2]: 4,
   ⋮
```

FIG. 4

```
MESSAGE TYPE: EVENT LIST,
GAME: SOCCER MEN'S FINAL,
EVENT [1]: {⋯},
EVENT [2]: {⋯},
   ⋮
EVENT [8]: {
   TIME: FIRST HALF 27 MINUTES,
   EVENT TYPE: FREE KICK (DIRECTLY AIMING AT GOAL)
   RESULT: SUCCESS
   ACTOR: {TEAM: BRAZIL, PLAYER NAME: NM}
}
```

FIG. 10

```
POINT OF [FULL NAME OF PLAYER B].
[CAUSE].
[FAMILY NAME OF PLAYER B], [TOTAL NUMBER OF GAMES]-TH GAME BREAK SUCCESS.
GAME COUNT, [FAMILY NAME OF PLAYER A] VS. [FAMILY NAME OF PLAYER B],
[NUMBER OF GAMES ACQUIRED BY PLAYER A] - [NUMBER OF GAMES ACQUIRED BY PLAYER B].
[NUMBER OF BREAK OF PLAYER B]-TH BREAK IN THIS SET.
```

FIG. 11

```
EVENT TYPE = POINT
[CAUSE] = UNFORCED ERROR OF PLAYER A OR PLAYER B
BREAK = Y
```

FIG. 12

```
POINT OF AD · MR.
UNFORCED ERROR OF DP.
MR, 10TH GAME BREAK SUCCESS.
GAME COUNT, DR VS. MR, 5-5.
THIRD BREAK IN THIS SET.
```

FIG. 18

```
PLAYERS PARTICIPATING IN COMPETITION
  [FULL NAME OF PLAYER A] = "A1 · A2"
  [FULL NAME OF PLAYER B] = "B1 · B2"
  [FAMILY NAME OF PLAYER A] = "A2"
  [FAMILY NAME OF PLAYER B] = "B2"
  ⋮
```

FIG. 19

```
EVENT LIST
EVENT [1]
  ⋮
EVENT [123]
  [TIME] = "○ HOUR △ MINUTE □ SECOND"
  [SET] = "4S"
  [GAME COUNT] = "B2" , "5"
  [UNFORCED ERROR] = "A2" , "12" .
  [BREAK SUCCESS] = "B2" , "6"
  ⋮
  [TOTAL NUMBER OF GAMES] = 10
  [NUMBER OF GAMES ACQUIRED BY PLAYER A] = 5
  [NUMBER OF GAMES ACQUIRED BY PLAYER B] = 5
  [NUMBER OF BREAKS OF PLAYER B] = 6
  ⋮
```

FIG. 20

| |
|---|
| CONDITIONS: UNFORCED ERROR OF PLAYER A, BREAK SUCCESS OF PLAYER B |
| [FULL NAME OF PLAYER B] NO POINTO.<br>[FAMILY NAME OF PLAYER A] NO ANFOOSUTOERAA.<br>[FAMILY NAME OF PLAYER B], DAI [TOTAL NUMBER OF GAMES] GEEMUBUREEKUSEEKOO.<br>GEEMUKAUNTO, [FAMILY NAME OF PLAYER A] TAI [FAMILY NAME OF PLAYER B],<br>[NUMBER OF GAMES ACQIRED BY PLAYER A] - [NUMBER OF GAMES ACQUIRES BY PLAYER B].<br>KONOSETTO <STRESSED INTONATION> [NUMBER OF BREAK OF PLAYER B] KAIME<br>NO BUREEKU </STRESSED INTONATION>. |

FIG. 21

| |
|---|
| CONDITIONS: UNFORCED ERROR OF PLAYER A, BREAK SUCCESS OF PLAYER B, NUMBER OF BREAK OF PLAYER B ≥ 5 |
| [FULL NAME OF PLAYER B] NO POINTO.<br>[FAMILY NAME OF PLAYER A] NO ANFOOSUTOERAA.<br>[FAMILY NAME OF PLAYER B], DAI [TOTAL NUMBER OF GAMES] GEEMUBUREEKUSEEKOO.<br>GEEMUKAUNTO, [FAMILY NAME OF PLAYER A] TAI [FAMILY NAME OF PLAYER B],<br>[NUMBER OF GAMES ACQIRED BY PLAYER A] - [NUMBER OF GAMES ACQUIRES BY PLAYER B].<br>KONOSETTO <STRESSED INTONATION> [NUMBER OF BREAK OF PLAYER B] KAIME<br>NO BUREEKU </STRESSED INTONATION>. |

FIG. 22

| |
|---|
| CONDITIONS: UNFORCED ERROR OF PLAYER A, BREAK SUCCESS OF PLAYER B, NUMBER OF BREAK OF PLAYER B < 5 |
| [FULL NAME OF PLAYER B] NO POINTO.<br>[FAMILY NAME OF PLAYER A] NO ANFOOSUTOERAA.<br>[FAMILY NAME OF PLAYER B], DAI [TOTAL NUMBER OF GAMES] GEEMUBUREEKUSEEKOO.<br>GEEMUKAUNTO, [FAMILY NAME OF PLAYER A] TAI [FAMILY NAME OF PLAYER B],<br>[NUMBER OF GAMES ACQIRED BY PLAYER A] - [NUMBER OF GAMES ACQUIRES BY PLAYER B].<br>KONOSETTO [NUMBER OF BREAK OF PLAYER B] KAIME NO BUREEKU. |

FIG. 23

```
B1·B2 NO POINTO.
A2 NO ANFOOSUTOERAA.
B2, DAI 10 GEEMUBUREEKU SEEKOO.
GEEMUKAUNTO, A2 TAI B2, 5-5.
KONO SETTO <STRESSED INTONATION> 6 KAIME NO BUREEKU </STRESSED INTONATION>.
```

FIG. 24

```
B1·B2 NO POINTO.
A2 NO ANFOOSUTOERAA.
B2, DAI 10 GEEMUBUREEKU SEEKOO.
GEEMUKAUNTO, A2 TAI B2, 5-5.
KONO SETTO 4 KAIME NO BUREEKU.
```

AUDIO GUIDANCE GENERATION DEVICE, AUDIO GUIDANCE GENERATION METHOD, AND BROADCASTING SYSTEM

TECHNICAL FIELD

The present invention relates to an audio guidance generation device, an audio guidance generation method, and a broadcasting system.

Priority is claimed on Japanese Patent Application No. 2017-102847, filed on May 24, 2017, the content of which is incorporated herein by reference.

BACKGROUND ART

When providing a sports program including video and audio of a sports competition in television broadcasting or other streamed forms, it is widely practiced to superimpose live audio describing the competition. This contributes to making sports programs easier to understand and enjoy.

In the related art, in order to produce live audio, announcers who are familiar with the competition have always been placed at game venues or the like to provide live commentary during the competition. Since this live commentary is costly, it may have been abandoned in many sports programs, or may be provided in a form that does not superimpose live audio. This is especially true in large-scale sports events where many competitions are held in parallel.

Therefore, a method for automatically generating a text explaining the situation of the competition from competition data of the sports competition has been proposed. For example, NPL 1 describes automatic generation of inning breaking text based on batter results at each inning of baseball, information shown on a scoreboard, and the like.

CITATION LIST

Non-Patent Literature

[NPL 1] Murakami Soichiro, Kanno Kyohei, Takamura Daiya, Okumura Manabu, "Automatic Generation of Inning Bulletin from Batter Performance", Language Processing Society 22nd Annual Conference, Proceedings, p. 338-341, Feb. 29, 2016

On the other hand, even in a television broadcast program in which live commentary spoken by an announcer or commentator is superimposed, when a listener listens to sports competition audio, it is sometimes impossible to sufficiently understand the situation of a competition only by the live commentary spoken by the announcer or commentator. Further, in live subtitle broadcasting, there is a delay of about 10 seconds after a live comment is uttered until a subtitle indicating the speech content is presented. This can also be a cause of insufficient understanding of the latest situation of the competition.

Broadcasters may conduct commentary broadcasts such that visually impaired people can enjoy television broadcast programs more. The commentary broadcast is a broadcast service that provides the contents shown on the screen in the voice of the presenter such as an announcer. In the related art, it takes a lot of people to produce content for commentary broadcast. Therefore, the ratio of broadcast programs in which commentary broadcast is carried out is limited among broadcast programs provided by broadcasters. In addition, subtitles have been produced by voice recognition processing or manual operation based on voices spoken by live announcers and the like. For such speech contents, it has been considered to provide supplementary information similar to that of commentary broadcast by voice, using the technique described in NPL 1 described above.

DISCLOSURE OF INVENTION

Technical Problem

However, the method described in NPL 1 is limited to baseball, and is a method of analyzing the data for each inning together and generating explanatory text summarizing the situation occurring at each inning. That is, the method described in NPL 1 does not take into account the generation of explanatory text in conjunction with a live broadcast video such as a sports broadcast.

The present invention has been made in view of the above points, and an object thereof is to provide an audio guidance generation device, an audio guidance generation device, an audio guidance generation method, and a broadcasting system, capable of accurately conveying the situation of a competition in conjunction with video.

Solution to Problem

The present invention has been made to solve the above-described problems, and an aspect of the present invention is an audio guidance generation device comprising a message management unit that receives and accumulates a message, wherein the message is distributed for every update, the message being data representing a latest situation of a competition; an explanation generation unit that generates an explanatory text for conveying unconveyed information detected from the message, based on conveyed information; and a speech synthesis unit that outputs a speech converted from the explanatory text, in which the explanation generation unit stores the unconveyed information for the explanatory text, as the conveyed information after generating the explanatory text, stands by until completion of output of the speech, and initiates a procedure for generating a new explanatory text based on updated unconveyed information.

Further, in the audio guidance generation device, the message management unit may detect a modified portion of the message due to update of the message, generate new information according to a type of the varied part, and further accumulate the generated new information.

Further, in the audio guidance generation device, the message management unit may select an information generation template corresponding to the type of the modified portion out of prestored information generation templates, each of the prestored information generation templates indicating a structure of the new information for each type of the modified portion, and generate the new information by integrating elements of the varied part into the selected information generation template.

Further, in the audio guidance generation device, the explanation generation unit may regard predetermined types of information, among pieces of information held as the conveyed information, as being unconveyed, in a case where a predetermined time has elapsed from a conveyance completion time.

Further, in the audio guidance generation device, the explanation generation unit may select an explanatory template corresponding to the type of the unconveyed information out of prestored explanatory templates, each of the prestored explanatory templates indicating a sentence pattern of the explanatory text for each type of unconveyed information, and generate the explanatory text by integrating elements of the unconveyed information into the selected explanatory template.

In the audio guidance generation device, the explanation generation unit may use a text template in which a stressed portion is predetermined for the competition data indicating a situation of the competition indicated by the message to generate the explanatory text indicating the stressed portion from the competition data, the speech synthesis unit may comprise a phoneme language feature generation unit that analyzes the explanatory text to generate a language feature for each phoneme and stressed intonation information for the phoneme; a time length calculation unit that generates a time length of the phoneme from the language feature and the stressed intonation information generated by the phoneme language feature generation unit, using a time length model; a frame language feature generation unit that generates a language feature for each frame of the phoneme from the time length of the phoneme generated by the time length calculation unit and the language feature of the phoneme, and associates the generated language feature with the stressed intonation information of the phoneme corresponding to the frame; an acoustic feature calculation unit that generates an acoustic feature for each frame, from the language feature of the frame generated by the frame language feature generation unit and the stressed intonation information corresponding to the frame, using an acoustic feature model; and a synthesis unit that synthesizes speech using the acoustic feature for each frame generated by the acoustic feature calculation unit, the time length model may be preliminarily learned, using the language feature for each phoneme, and stressed intonation information indicating presence or absence of stressed intonation for the phoneme as an input, and the time length of the phoneme as an output, and the acoustic feature model may be preliminarily learned, using the language feature for each frame of the phoneme and stressed intonation information indicating presence or absence of stressed intonation of the frame as an input, and the time length of the phoneme as an output, and an acoustic feature of the frame as an output.

In the audio guidance generation device, the time length model and the acoustic feature model each may be learned further using sentence ending information indicating whether the phoneme is a phoneme of a sentence ending word having a part of speech as a noun, the phoneme language feature generation unit may generate the sentence ending information for each phoneme, based on the part of speech of the sentence ending word of the text, the time length calculation unit may generate a time length of the phoneme, by using the time length model, from the language feature of the phoneme, the stressed intonation information, and the sentence ending information, the frame language feature generation unit may associate the language feature for each frame with the sentence ending information, and the acoustic feature calculation unit may generate an acoustic feature of each frame, by using the acoustic feature model, from the language feature of the frame, and the stressed intonation information and the sentence ending information corresponding to the frame.

Another aspect of the present invention may be a broadcasting system including the above audio guidance generation device; a first buffer unit that stores audio data indicating the speech converted by the speech synthesis unit and time information indicating the time of a situation of the competition used to generate the explanatory text; a second buffer unit that stores video data indicating the situation of the competition in association with time information indicating the time of the situation; and a multiplexing unit that extracts audio data at a designated time from the first buffer unit, the designated time being a first predetermined duration earlier than a current time, extracts video data at the designated time from the second buffer unit, and multiplexes the audio data and the video data.

Still another aspect of the present invention may be the broadcasting system described above, in which the message management unit stores the competition data including the message in association with time information indicating the time of the situation of the competition indicated by the message, the explanation generation unit refers to the competition data at a time as unconveyed information from the message management unit, the time being a second predetermined duration earlier than the current time, and the second predetermined duration is shorter than the predetermined duration.

Further still another aspect of the present invention may be a broadcasting system including the above audio guidance generation device; and a transmission device that transmits the explanatory text and the speech.

Further still another aspect of the present invention is an audio guidance generation method of an audio guidance generation device, the method including a message management step of receiving and accumulating a message, wherein the message is distributed for every update, the message being data representing a latest situation of a competition; an explanation generation step of generating an explanatory text for conveying unconveyed information detected from the message, based on conveyed information; and a speech synthesis step of outputting a speech converted from the explanatory text, in which the explanation generation step comprising a step of storing the unconveyed information for the explanatory text as the conveyed information after generating the explanatory text, a step of standing by until completion of output of the speech, and a step of initiating a procedure for generating a new explanatory text based on updated unconveyed information.

Advantageous Effects of Invention

According to the present invention, it is possible to provide audio accurately conveying the situation of a competition in conjunction with video.

BRIEF DESCRIPTION OF DRAWINGS

FIG. 3 is a diagram showing an example of a message according to the first embodiment.

FIG. 4 is a diagram showing another example of the message according to the first embodiment.

FIG. 10 is a diagram showing an example of an explanatory template according to the first embodiment.

FIG. 11 is a diagram showing an example of an explanatory template selection rule according to the first embodiment.

FIG. 12 is a diagram showing an example of an explanatory text according to the first embodiment.

FIG. 18 is a diagram showing an example of competition data according to the second embodiment.

FIG. 19 is a diagram showing another example of the competition data according to the second embodiment.

FIG. 20 is a diagram showing an example of an explanatory template according to the second embodiment.

FIG. 21 is a diagram showing another example of the explanatory template according to the second embodiment.

FIG. 22 is a diagram showing still another example of the explanatory template according to the second embodiment.

FIG. 23 is a diagram showing an example of a text generated according to the second embodiment.

FIG. 24 is a diagram showing another example of a text generated according to the second embodiment.

BEST MODE FOR CARRYING OUT THE INVENTION

First Embodiment

Hereinafter, a first embodiment of the present invention will be described in detail with reference to the accompanying drawings.

Figure 1:
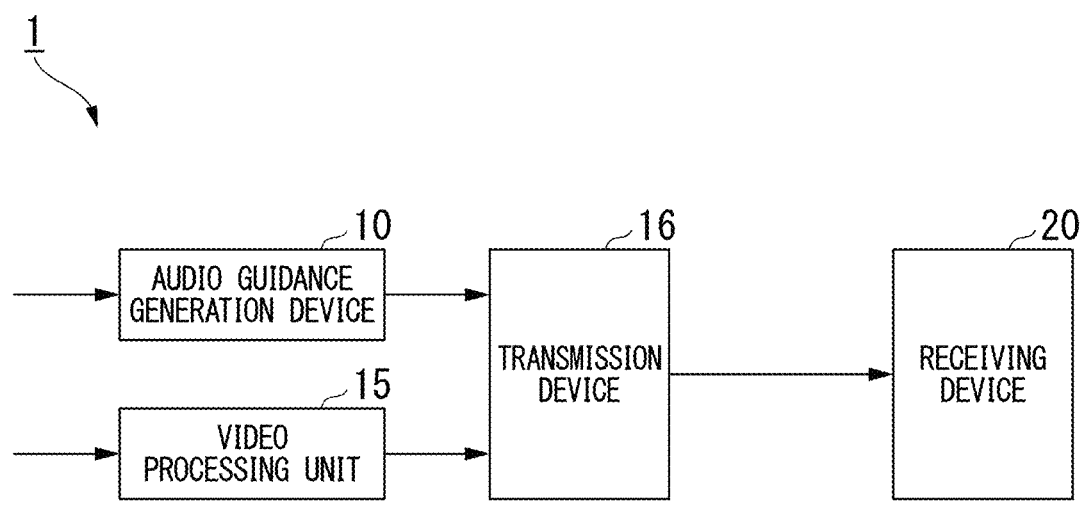
FIG. 1 is a block diagram illustrating a configuration example of a broadcasting system according to a first embodiment.

FIG. 1 is a block diagram illustrating a configuration example of a broadcasting system 1 according to the first embodiment. The broadcasting system 1 includes an audio guidance generation device 10, a video processing unit 15, a transmission device 16, and a receiving device 20. The audio guidance generation device 10, the video processing unit 15, and the transmission device 16 are a transmission-side device group mainly owned by a broadcaster. The receiving device 20 is a receiving-side device mainly owned by the viewer. In the following description, a case where the broadcasting system 1 is applied to television broadcasting is taken as an example.

The audio guidance generation device 10 obtains the latest version of a message, which are data representing the latest information on the competition, every time the data is updated. The audio guidance generation device 10 receives, as a message, for example, competition data distributed in real time from a data center over a communication network. The data center may be an official data center for competitions such as Olympic Broadcasting Services (OBS). The audio guidance generation device 10 may receive competition data directly or indirectly from an editing device of a broadcaster or a content creator. The competition data is data in a predetermined format (for example, Olympic Data Feed (ODF)) indicating the situation of the sports competition represented in the video provided by broadcasting or the like. An example of competition data will be described later.

The audio guidance generation device 10 accumulates the acquired latest reception message. The audio guidance generation device 10 detects unconveyed information from the reception message based on the conveyed information. The audio guidance generation device 10 generates an explanatory text for conveying the detected unconveyed information, and outputs the audio data converted from the generated explanatory text, to the transmission device 16. The audio guidance generation device 10 accumulates unconveyed information used for generating the explanatory text as conveyed information. The audio guidance generation device 10 waits only for the time necessary to play back the audio data, and then repeats a series of processes of detecting new unconveyed information, and generating an explanatory text of the detected unconveyed information. The audio guidance generation device 10 may output the generated explanatory text to the transmission device 16.

The video processing unit 15 acquires video data and audio data. The acquired video data and audio data are data representing the video and audio of a sports competition indicated by the competition data. The video processing unit 15 receives, for example, video data from an imaging device (for example, a video camera) installed in a competition venue, and audio data from a sound collection device (for example, a microphone) directly or indirectly. The video processing unit 15 may edit the video data and audio data of the section or part broadcasted, from the acquired video data and audio data, according to the operation of the operator. The video processing unit 15 outputs the acquired or edited video data and audio data to the transmission device 16.

In the following description, the audio data provided from the video processing unit 15 is referred to as original audio data, the audio data generated by the audio guidance generation device 10 is referred to as audio description data, and both audio data are distinguished. The original audio data may be only the background sound recorded at the venue, or may be data indicating a speech such as a live commentary is mixed with the background sound.

The transmission device 16 multiplexes the audio description data input from the audio guidance generation device 10, and the video data and original audio data which are input from the video processing unit 15. The transmission device 16 transmits the multiplexed data obtained by multiplexing to the broadcast transmission path. The broadcast transmission path is, for example, a broadcast wave in a predetermined frequency band. A part of the broadcast transmission path may include a communication line.

The audio description data and original audio data may be multiplexed as sub voice and main voice in audio multiplex broadcasting, respectively. When the explanatory text is input from the audio guidance generation device 10, the transmission device 16 may further multiplex the input explanatory text as subtitle data.

The receiving device 20 receives multiplexed data transmitted through the broadcast transmission path, and presents the content of the broadcast program based on the received multiplexed data. The receiving device 20 separates the received multiplexed data into video data, original audio data, and audio description data. The receiving device 20 includes a display unit (for example, a display) and a playback unit (for example, a speaker). The display unit displays a video based on the separated video data. The playback unit plays back audio related to one or both of the original audio data and the audio description data. The receiving device 20 may select one of the audio based on the original audio data and the guidance audio based on the audio description data, in accordance with a user operation (for example, pressing of the main voice button or the sub voice button of the remote controller). The receiving device 20 may mix the original audio data and the guidance audio, and cause the playback unit to play back the mixed speech obtained by the mixing.

In a case where the multiplexed data includes subtitle data, the receiving device may separate the subtitle data from the multiplexed data. The receiving device 20 may superimpose the character string indicated by the separated subtitle data on the video, in response to a user operation (for example, pressing a subtitle button on the remote controller). The receiving device 20 displays, on the display unit, a video on which the character string is superimposed. The receiving device 20 is, for example, a television receiver.

The audio guidance generation device 10 may output the generated explanatory text, to the video processing unit 15, instead of the transmission device 16.

When the explanatory text is input from the audio guidance generation device 10, the video processing unit 15 may superimpose the character string represented by the explanatory text on the video data as a subtitle, and output the video data on which the subtitle is superimposed, to the transmission device 16.

(Audio Guidance Generation Device)

Next, a configuration example of the audio guidance generation device 10 according to the present embodiment will be described.

Figure 2:
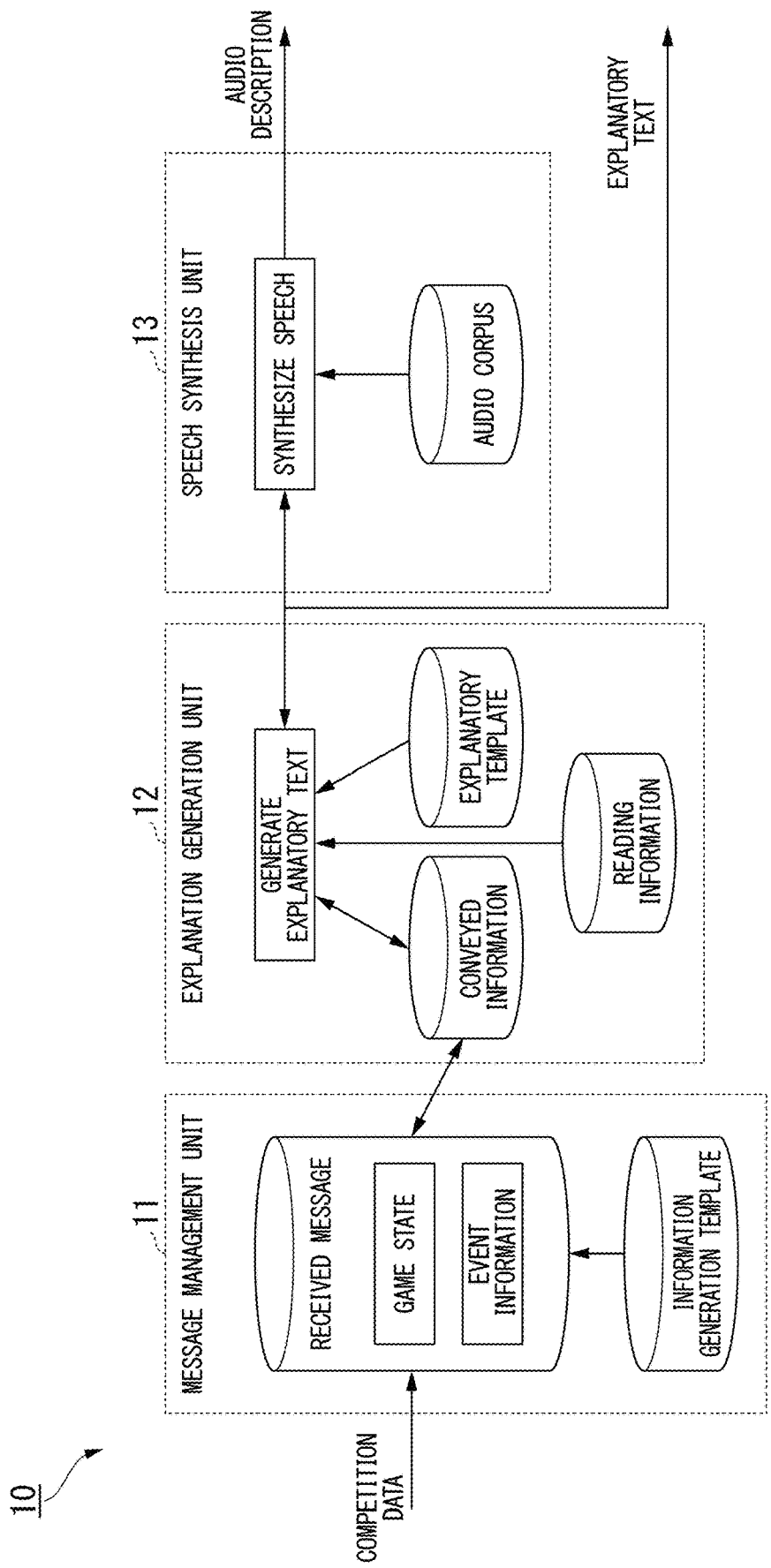
FIG. 2 is a block diagram illustrating a configuration example of an audio guidance generation device according to the first embodiment.

FIG. 2 is a block diagram illustrating a configuration example of the audio guidance generation device 10 according to the present embodiment.

The audio guidance generation device 10 includes a message management unit 11, an explanation generation unit 12, and a speech synthesis unit 13.

The message management unit 11 holds the latest version of the acquired reception message. The message management unit 11 may be configured to hold the latest version for each type, assuming that the acquired reception message is divided into a plurality of different types. The message type is, for example, a game state message indicating the state of a competition (game state), an event list message that lists events that have occurred, or the like. The message management unit 11 also holds the acquired reception message of the latest version together with the message before the latest version, and detects a message varied part by comparing the previous version with a new reception message when the new reception message is acquired. The message management unit 11 may be configured to generate new information according to the detected type of variation, and then add the generated information to a message of a special message type held by the message management unit 11. As an example, this function can be used to generate event information by detecting an event from a variation in the game state in a competition for which only the game state is distributed as a message, and to hold it as an event list including the generated event information. Processing performed by the message management unit 11 will be described later.

When the message management unit generates new information according to the above procedure, the message management unit 11 may use an information generation template stored in advance in the message management unit 11. The information generation template is data indicating a template of an information structure for generating, as a part of a message, new information including an information element, which has the information element that is a predetermined part of the message as a blank. The message management unit 11 determines whether there is an information generation template that matches a predetermined selection rule based on the type of varied part of the reception message, from among the stored information generation templates, and selects the information generation template corresponding to the selection rule determined to match. The message management unit 11 integrates predetermined information elements into the selected information generation template to generate a part of the message to be added.

The explanation generation unit 12 performs explanation generation processing and utterance management processing. In the explanation generation processing, the explanation generation unit 12 compares the reception message stored in the message management unit 11 with the conveyed information already stored in the explanation generation unit 12, and detects the presence or absence of new unconveyed information. The unconveyed information corresponds to a difference from the conveyed information in the reception message stored in the message management unit 11. The conveyed information corresponds to past unconveyed information used for generating the explanatory text converted into the audio description data that has already been output. The explanation generation unit 12 generates an explanatory text indicating the situation of the competition represented by the newly detected unconveyed information. The explanation generation unit 12 outputs the generated explanatory text to the speech synthesis unit 13. The explanation generation unit 12 may output the generated explanatory text to the transmission device 16 (FIG. 1) in parallel with the output to the speech synthesis unit 13.

In the utterance management processing, the explanation generation unit 12 monitors the output state (that is, the utterance state) of the audio description data from the speech synthesis unit 13, and waits until the output is completed. For example, the explanation generation unit 12 determines that the audio description data being output from the time when the explanatory text is output until the time when an output end notification (described later) is input from the speech synthesis unit 13. The speech synthesis unit 13 determines that the audio description data is not output (no utterance) until the next explanatory text is output after the output end notification is input. After the output of the audio description data is ended, the explanation generation unit 12 stores the unconveyed information used for generating the explanatory text used for the conversion to the audio description data for which the output is ended, as an addition of the conveyed information. Thus, the conveyed information is updated. The update processing of the conveyed information may be performed during a standby time until the output process in the speech synthesis unit 13 is completed. Thereafter, the explanation generation unit 12 performs the explanation generation processing again on the conveyed information after update and the latest reception message.

When generating the explanatory text, the explanation generation unit 12 may use an explanatory template stored in advance in the explanation generation unit 12. The explanatory template is data that has an input field for an information element, which is a pre-designated part of the message as a blank, and indicates a sentence pattern (in other words, a perforated text) of an explanation text for explaining the information element. The explanation generation unit 12 selects a corresponding explanatory template according to a predetermined selection rule based on the type of unconveyed information, from the stored explanatory templates. The explanation generation unit 12 generates the explanatory text by integrating predetermined information elements into the selected explanatory template.

The speech synthesis unit 13 performs speech synthesis processing on the explanatory text input from the explanation generation unit 12 to generate audio description data indicating the utterance audio representing the speech content in the explanatory text. The speech synthesis unit 13 can use, for example, a corpus-based speech synthesis method as a known speech synthesis method. When the corpus-based speech synthesis method is used, the speech synthesis unit 13 refers to an audio corpus stored in advance. The speech synthesis unit 13 outputs the generated audio description data to the transmission device 16 at a predetermined speech rate (for example, 300 to 400 mora/min in Japanese). When the output of the audio description data is ended, the speech synthesis unit 13 outputs an output end notification indicating the end to the explanation generation unit 12.

Even when the explanatory text is written in Japanese, element information of a part of the explanatory text, for example, the name of the player of the competition may include a character string made up of alphabets. In that case, the explanation generation unit 12 may perform reading estimation processing of the element information, from the character string or the nationality information of the player in addition thereto, and determine the reading of the character string of the element information. The speech synthesis unit 13 uses, for example, non-patent literature: Miyazaki, Kumano, Imai, "translation of personal names using nationality information", 15th Information Science and Technology Forum Proceedings (FIT2016), E-018 No. 2, p. 145-146, Aug. 23, 2016, as reading estimation processing method.

(Message)

Next, an example of a message according to the present embodiment will be described.

FIG. 3 is a diagram illustrating an example of a message including game state data. In the present embodiment, competition data formed based on the ODF can be used as a message. ODF is data feed indicating a message described using Extensible Markup Language (XML) which is a type of markup language. By using tags defined in the markup language, inclusion relationships and parallel relationships among configuration information, and their types and attributes are described. However, in the examples shown in FIGS. 3 and 4, the notation of the tag is omitted or simplified, and substantial information is represented.

At the beginning of FIG. 3, "game state" is described as the message type, and "soccer men's final" is described as the target game.

Further, "Brazil" is described as the team 1 which is one of the battle cards, and "Germany" is described as the team 2 which is the other.

"3" and "4" are described as the scores of teams 1 and 2, respectively.

Therefore, the message shown in FIG. 3 indicates that, as a game state, the soccer men's final is a match between the Brazilian team and the German team, and the score is 3-4.

FIG. 4 shows an example of a message including event information. At the beginning of FIG. 4, "event list" is described as the message type, and "soccer men's final" is described as the target game.

Event [1], Event [2], . . . , and Event [8] indicate the first, second, . . . , and eighth event information, respectively.

In event [8], "first half 27 minutes" is described as the time. "Free kick (directly aiming at the goal)" is described as the event type. As a result, "success" is described. "Team: Brazil, player name NM" is described as the actor.

Therefore, the message shown in FIG. 4 indicates that as the eighth event, the player NM who belongs to the Brazilian team aims directly at the goal by a free kick in 27 minutes from the start of the first half set of soccer men's final.

(Message Management)

Next, message management processing according to the present embodiment will be described.

Figure 5:
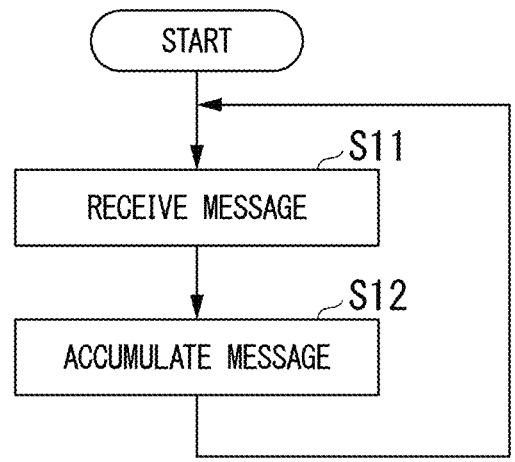
FIG. 5 is a flowchart illustrating a first example of message management processing according to the first embodiment.

FIG. 5 is a flowchart illustrating a first example of message management processing according to the present embodiment. This example is a basic type of message management processing.

(Step S11) The message management unit 11 receives the latest version of the message from the distribution source at that time. Thereafter, the process proceeds to step S12.

(Step S12) The message management unit 11 accumulates the received latest version of the message. Thereafter, the process returns to step S1.

Figure 6:
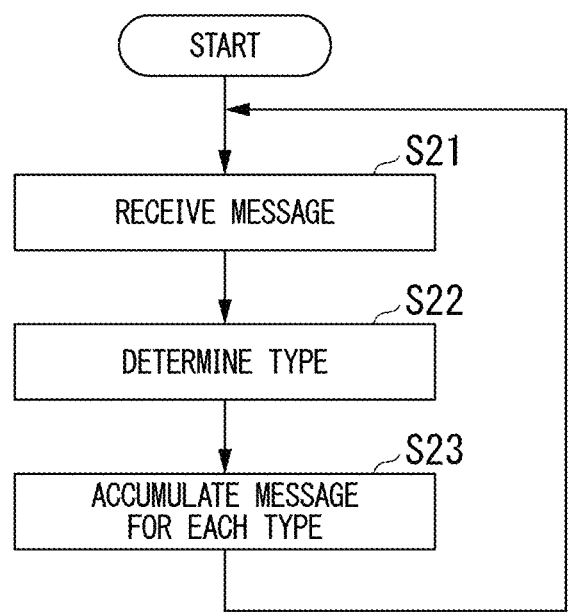
FIG. 6 is a flowchart illustrating a first example of message management processing according to a second embodiment.

FIG. 6 is a flowchart illustrating a second example of message management processing according to the present embodiment. This example is characterized in that there are a plurality of message types, and a message is classified into any type out of the types.

(Step S21) The message management unit 11 receives the latest version of the message from the distribution source at that time. Thereafter, the process proceeds to step S22.

(Step S22) The message management unit 11 determines the type of the latest version of the message at that time. In the type determination, the message management unit 11 may refer to a tag attached to the message or a set parameter. Thereafter, the process proceeds to step S23.

(Step S23) The message management unit 11 accumulates the received latest version of the message for each determined type. Thereafter, the process returns to step S21.

In step S12 (FIG. 5) or step S23 (FIG. 6), the message management unit 11 may reject the message accumulated in the past and completely replace it with the latest version of the message.

Figure 7:
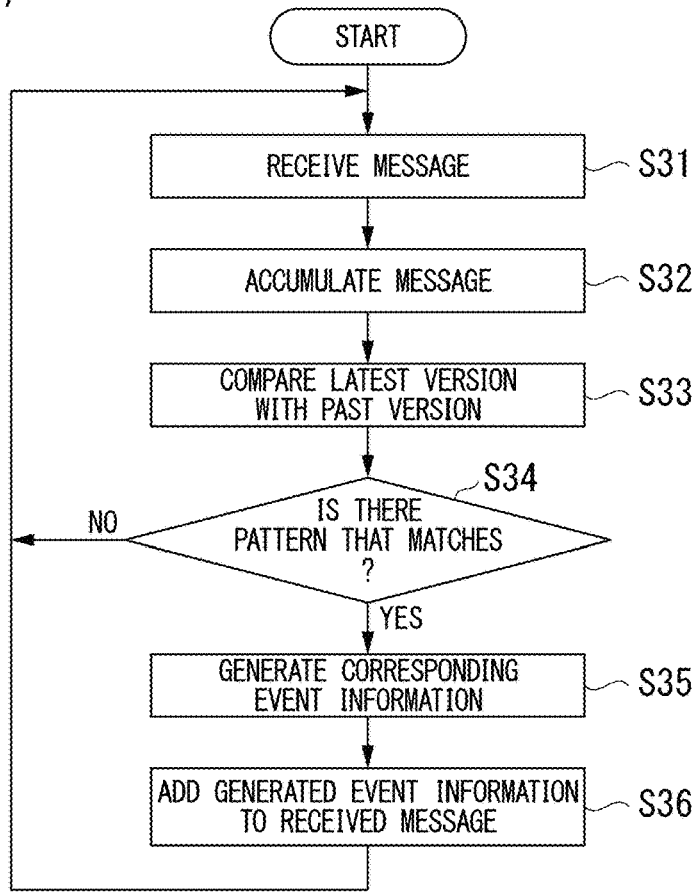
FIG. 7 is a flowchart illustrating a first example of message management processing according to a third embodiment.

FIG. 7 is a flowchart illustrating a third example of message management processing according to the present embodiment. This example is characterized in that event information corresponding to a pattern is generated when the pattern of the varied part of the message matches a predetermined pattern.

(Step S31) The message management unit 11 receives the latest version of the message from the distribution source at that time. Thereafter, the process proceeds to step S32.

(Step S32) The message management unit 11 accumulates the received latest version of the message. At this time, the message management unit 11 maintains the message accumulated in the past without rejecting it. Thereafter, the process proceeds to step S33.

(Step S33) The message management unit 11 compares the latest version of the message with the immediately previous version of the message, and detects a varied part from the immediately previous version. Thereafter, the process proceeds to step S34.

(Step S34) The message management unit 11 determines whether or not there is a pattern that matches the detected varied part pattern among the varied part patterns stored in advance. The message management unit 11 stores a varied part pattern and a set of information generation template corresponding to the pattern for each varied part type.

When it is determined that there is a matching pattern (YES in step S34), the process proceeds to step S35. When it is determined that there is no matching pattern (NO in step S34), the process returns to step S31.

(Step S35) The message management unit 11 specifies a generation rule corresponding to the matching pattern with reference to the event generation data, and generates event information based on the specified generation rule and the latest version of the message. Thereafter, the process proceeds to step S36.

(Step S36) The message management unit 11 adds the generated event information to the latest version of the message, and stores it in association with the latest version of the message. Thereafter, the process returns to step S31.

(Event Information Generation Processing)

Next, event information generation processing performed from step S33 to step S35 (FIG. 7) will be described.

Figure 8:
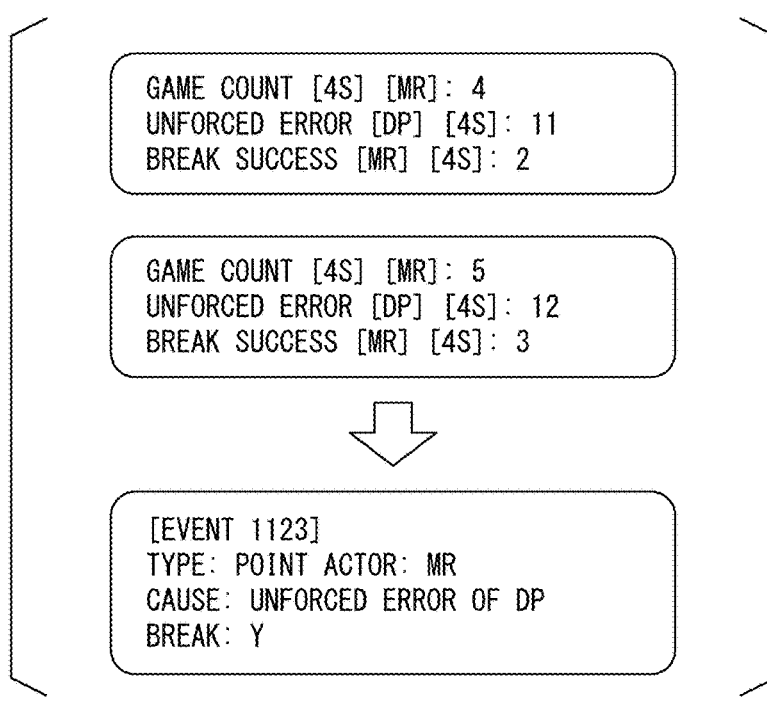
FIG. 8 is an explanatory diagram showing an example of event information generation processing according to the first embodiment.

FIG. 8 is an explanatory diagram showing an example of event information generation processing.

FIG. 8 shows examples of past messages, latest messages, and generated event information in this order from top to bottom. In the example shown in FIG. 8, it is assumed that the message of the immediately previous version and the message of the latest version are game state data in a tennis competition, respectively.

In step S33, the message management unit 11 compares the immediately previous version of the message with the latest version of the message, and detects a varied part. In the example shown in FIG. 8, items of a game count, the number of unforced errors, and the number of breaks (break success) are detected as varied parts. Here, in the fourth set (4S), the change in the game count of the competitor MR from 4 to 5, the change in the number of unforced errors of the competitor DP from 11 to 12, and the change in the number of breaks of the competitor MR from 2 to 3 are detected.

In step S34, the message management unit 11 detects that there is a pattern whose type is a point (score) among the patterns of the varied part stored in advance, as a pattern that matches the element information pattern of the varied part detected.

In step S35, the message management unit 11 specifies a generation rule corresponding to the selected pattern with reference to the information generation template, and generates event information based on the specified generation rule. Here, the message management unit 11 specifies the competitor MR as an actor included in the varied part, the unforced error of the competitor DP who is the opponent of the actor as a cause, and the competitor MR's break success (Y). Then, the message management unit 11 integrates the specified information with the identifier "[event 1123]" to generate event information including the type "point", the actor "MR", the cause "DP unforced error" and "break: Y". The identifier [event 1123] is identification information for uniquely identifying each event.

(Explanation Generation Processing)

Next, explanation generation processing according to the present embodiment will be described.

Figure 9:
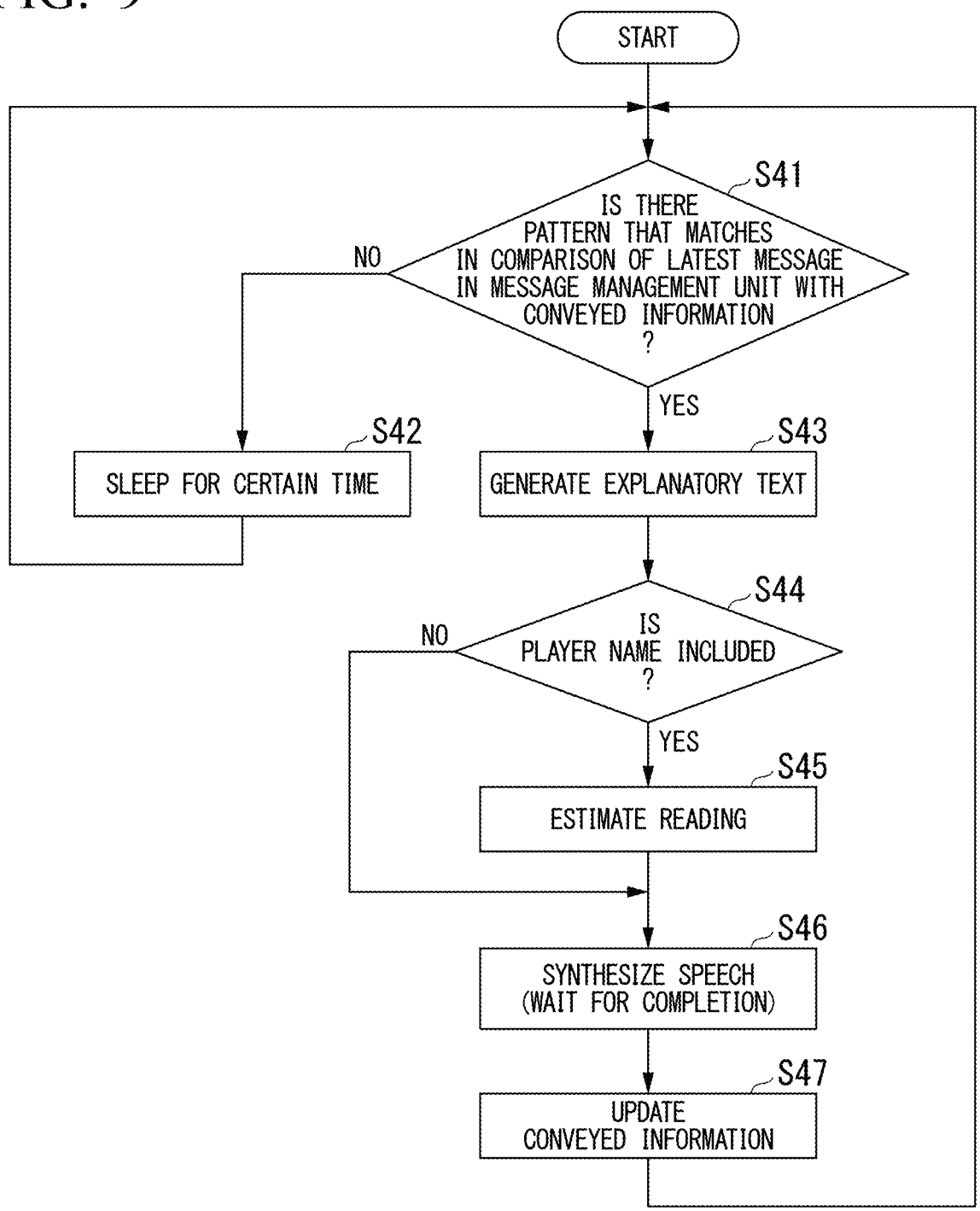
FIG. 9 is a flowchart illustrating an example of explanation generation processing according to the first embodiment.

FIG. 9 is a flowchart illustrating an example of explanation generation processing according to the present embodiment. The process shown in FIG. 9 is executed asynchronously with the process shown in any of FIGS. 5 to 7.

(Step S41) The explanation generation unit 12 compares the latest message stored in the message management unit 11 with the conveyed information stored in the own unit, and detects unconveyed information. The explanation generation unit 12 determines whether or not there is a pattern that matches the detected unconveyed information, among the patterns of unconveyed information stored in advance. The explanation generation unit 12 stores a set of a pattern of unconveyed information and an explanatory template corresponding to the pattern, for each type of the unconveyed information. When it is determined that there is a matching pattern (YES in step S41), the process proceeds to step S43. When it is determined that there is no matching pattern (NO in step S41), the process proceeds to step S42.

(Step S42) The explanation generation unit 12 waits (sleeps) without performing a process for a certain time (for example, 1 second), and then returns to the process of step S41.

(Step S43) The explanation generation unit 12 reads the explanatory template corresponding to the pattern determined to match, and generates the explanatory text based on the read explanatory template and the unconveyed information. Thereafter, the process proceeds to step S44.

(Step S44) The explanation generation unit 12 determines whether or not the explanatory text includes a player name described by, for example, a character string of alphabets. When it is determined that the player name is included (YES in step S44), the process proceeds to step S45. When it is determined that a player name is not included (NO in step S44), the process proceeds to step S46.

(Step S45) The explanation generation unit 12 performs the above-described reading estimation processing based on the nationality information for the player name portion to determine the Japanese reading of the explanatory text. The explanation generation unit 12 updates the explanatory text with the reading determined for the part. Thereafter, the process proceeds to step S46.

(Step S46) The explanation generation unit 12 outputs the generated explanatory text to the speech synthesis unit 13. The speech synthesis unit 13 performs speech synthesis processing on the explanatory text input from the explanation generation unit 12 to generate audio description data. The speech synthesis unit 13 outputs the generated audio description data to the transmission device 16 at a predetermined speech rate. The explanation generation unit 12 waits until the output of the audio description data is completed, and then proceeds to the process of step S47.

(Step S47) The explanation generation unit 12 updates the conveyed information, by accumulating the unconveyed information used for generating the output explanatory text as new conveyed information. Thereafter, the process returns to step S41.

The pattern of the unconveyed information may include designated information indicating that a predetermined information element of the conveyed information is regarded as being unconveyed after a predetermined time (for example, 30 seconds) has elapsed. In the process of step S41, the explanation generation unit 12 includes the designated information element in the unconveyed information when determining whether the pattern including the designated information matches the pattern of the unconveyed information. Therefore, even when the designated information element is actually conveyed, it can be conveyed again. Therefore, even when there is no change in the game situation or the change is small, it is possible to repeatedly transmit the designated information element, for example, the game state. Therefore, in such a case, it is possible to prevent the listener from forgetting the situation of the competition. Even a listener who has listened to the audio description from the middle of the game can understand the game state.

Among the processes shown in FIG. 9, the processes of step S44 and step S45 are not essential and may be omitted.

(Explanatory Template)

Next, an example of an explanatory template according to the present embodiment will be described.

FIG. 10 is a diagram showing an example of an explanatory template according to the present embodiment.

FIG. 10 is an example of an explanatory template associated with a pattern having the event type as a point. This explanatory template shows a sentence pattern for explaining a point caused by the action of the player B as an event in the competition and a game count, the number of acquired games, and the number of breaks in the target set as a game state. The explanatory template provided with, among the information elements of the unconveyed information, blanks for substituting [full name of player B] who obtains a score, [cause], [full name of player B] who succeeded in the game break that is the cause of the score, [total number of games], [family name of player A] and [family name of player B] who are competitors, [number of games acquired by player A] and [number of games acquired by player B] as score of each competitor, and [number of breaks of player B] who is an actor at the time of scoring.

Next, an example of a pattern selection rule corresponding to the explanatory template shown in FIG. 10 will be described.

FIG. 11 is a diagram showing an example of an explanatory template selection rule shown in FIG. 10.

In this example, the condition for selecting the pattern corresponding to the explanatory template includes, as the information element included in the unconveyed information, the event type is "point", and "unforced error of player A (or player B)" and "break success (Y)" as the cause of the event. Such a selection rule is set in advance for each pattern of each explanatory template.

(Explanatory Text)

Next, an example of explanatory text generated using the explanatory template shown in FIG. 10 will be described. FIG. 12 is a diagram illustrating an example of an explanatory text generated using the explanatory template shown in FIG. 10.

In step S43 (FIG. 9), the explanation generation unit 12 specifies the selection rule of the pattern shown in FIG. 11 among patterns stored in advance, as a pattern that matches the information element included in the unconveyed information, as the unconveyed information pattern. The explanation generation unit 12 selects the explanatory template illustrated in FIG. 12 as the explanatory template corresponding to the specified pattern.

The explanation generation unit 12 substitutes the corresponding information element of the unconveyed information in each of the blank provided in the selected explanatory template. Specifically, the explanation generation unit 12 substitutes the blanks of "full name of player B", "cause", "family name of player B", and "total number of games" in the explanatory template shown in FIG. 10 with "AD·MR", "unforced error of DP", "MR", and "10". The explanation generation unit 12 further substitutes the blanks of [family name of player A], [family name of player B], [number of games acquired by player A], [number of games acquired by player B], and [number of breaks of player B] with "DR", "MR", "5", "5", and "3". Therefore, an explanatory text indicating the sentence "MR, 10th game break success. game count, DR vs. MR, 5-5. This third break." is generated.

Even when the above-described designated information is associated with a certain pattern, the explanation generation unit 12 regards the information element designated by the designation information as unconveyed information after a predetermined time has elapsed from transmission, and can generate explanatory text by the method described above.

For example, it is assumed that element information having a message type as a game state is set in the designated information. In this case, the element information having a message type as a game state is included in the unconveyed information, and an explanatory template corresponding to a pattern that matches the pattern of element information included in the entire unconveyed information is selected. Here, as a selection rule, the explanation generation unit 12 selects the following explanatory template as the corresponding explanatory template, when a game state type is "game count", and element information matches the conditions including all of [game name], [family name of player A], [family name of player B], [number of sets], [number of games acquired by player A], and [number of games acquired by player B].

[competition name], [family name of player A] vs. [family name of player B]. currently the [number of sets]-th. game count [number of games acquired by player A] vs. [number of games acquired by player B].

The explanation generation unit 12 substitutes respective fields of [game name], [family name of player A], [family name of player B], [number of sets], [number of games acquired by player A], and [number of games acquired by player B] with "tennis men's singles final", "DP", "MR", "1", "5" and "5", which is the element information included in the unconveyed information, and each of which is the element information included in the unconveyed information. Thus, the explanation generation unit 12 can generate the following explanatory text.

"Tennis men's singles final, DP vs. MR. Currently the first set. Competition count 5 to 5."

As described above, the audio guidance generation device 10 according to the present embodiment includes a message management unit 11, an explanation generation unit 12, and a speech synthesis unit 13. The message management unit 11 accumulates the competition data indicating the situation of a competition as a reception message. The situation of the competition described in the competition data may be represented in a video broadcast in parallel. The explanation generation unit 12 generates an explanatory text of unconveyed information detected from the reception message, based on the conveyed information. The speech synthesis unit 13 outputs audio converted from the explanatory text. The explanation generation unit 12 may generate a new explanatory text of the unconveyed information, using the unconveyed information used for generating the explanatory text as the conveyed information, after the output of the audio from the speech synthesis unit 13 is completed.

According to this structure, the audio based on the explanatory text indicating the situation of the competition represented on the video is provided without human intervention. In addition, after the one-time provision of audio is completed without interruption, the provision of audio for explaining the situation of a new competition is started at that time. Therefore, the situation of the competition can be accurately conveyed to the listener in conjunction with the progress of the competition shown in the video.

When the event information indicating the event of the competition is not included in the varied part of the reception message, the message management unit 11 may generate event information in which variation in the game state that is the state of the competition included in the varied part as an event.

According to this configuration, even when the event information is not provided, the changed game state can be conveyed to the listener, with the change in the game state as an event. Since the listener can understand the progress of the competition in more detail, the competition can be enjoyed more.

The explanation generation unit 12 may handle, among pieces of information held as the conveyed information, regards information for which a predetermined time has elapsed after it is conveyed, as unconveyed even if there is no change from the latest message, and generate a text again explaining the same content.

According to this configuration, in a case where the situation of the competition does not change with time, information that the listener may have forgotten can be repeatedly conveyed. Even a listener who starts listening from the middle of the competition can understand the situation of the competition.

The explanation generation unit 12 may store in advance an explanatory template indicating the sentence pattern of the explanatory text for each type of unconveyed information to be conveyed, and select an explanatory template corresponding to the type of unconveyed information from the stored explanatory template. The explanation generation unit 12 generates the explanatory text by integrating the unconveyed information into the selected template.

According to this configuration, without developing a system that supports different competitions, only the explanatory template is described in advance for each competition, so it is possible to convey the situation of the competition without performing complicated processing. Economical realization can be achieved by reducing the work and system scale for that purpose.

The broadcasting system 1 may also include the audio guidance generation device 10 and a transmission device 16 that transmits the explanatory text and the generated audio.

According to this configuration, the situation of the competition is conveyed to the viewer through the explanatory text indicating the content of the audio to be conveyed. Therefore, even a hearing-impaired person can view the explanatory text to understand the situation of the competition. Thus, it is possible to make economically diversified viewers enjoy the sports competition.

Second Embodiment

Next, a second embodiment of the present invention will be described. The audio guidance generation device 10 according to the first embodiment generates an audio commentary (in other words, audio description) from competition data indicating the progress status such as sports competition scores, goals, and fouls. By generating an audio description from this competition data, for example, it is possible for visually impaired people to enjoy sports broadcasts on television more, and to add audio commentary to sports competition videos live-streamed via internet.

In recent years, speech synthesis technology using statistical models has advanced. For example, a technique has been proposed in which a deep neural network (DNN) is used to learn speaker characteristics and emotional expressions, and from a text, speech synthesis is performed in which the speakers and emotions are controlled. This makes it possible to synthesize speech with rich expression.

As described in the first embodiment, the progress of the competition can be guided by audio by using a method for generating an audio description from the competition data. However, in the first embodiment, the text is simply speech-synthesized. Therefore, the synthesized speech becomes audio with no sharp intonation, and the intention of guidance may not be sufficiently expressed.

When generating an audio description using a method that synthesizes speech in which the speaker and emotions are controlled, simply controlling the speaker and emotions for the entire text cannot control the audio and the stressed intonation in the middle of the text. Therefore, even when an audio description is generated from the competition data using this method, there is a problem that the intention of the guidance cannot be expressed sufficiently because it is not possible to add a sharpness to the intonation of the audio.

The present embodiment has been made in view of such a problem, and an object thereof is to generate audio with intonation from competition data. In the following description, a difference from the first embodiment will be mainly described. The same constituent elements as in the first embodiment are denoted by the same reference numerals, and the description is used.

Figure 13:
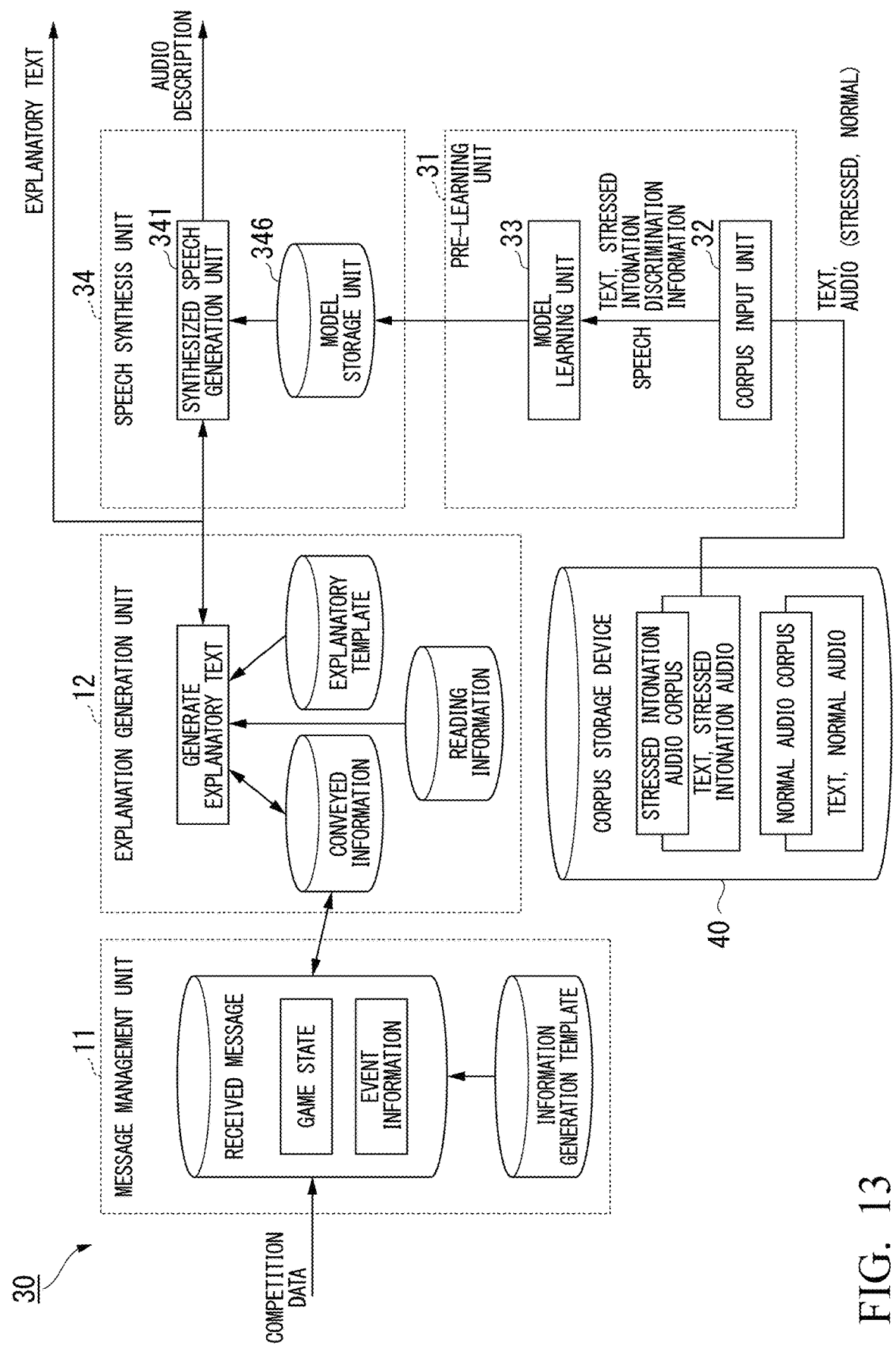
FIG. 13 is a block diagram illustrating a configuration example of an audio guidance generation device according to a second embodiment.

FIG. 13 is a block diagram illustrating a configuration example of an audio guidance generation device 30 according to the present embodiment.

The audio guidance generation device 30 generates audio (synthesized speech) from competition data indicating the progress state of sports or the like.

In the pre-learning stage, the audio guidance generation device 30 uses a corpus as learning data stored in the corpus storage device 40 to learn an audio model for converting text into speech offline by DNN.

The corpus includes a stressed intonation audio corpus and a normal audio corpus.

The stressed intonation audio corpus is learning data in which a text and a speech spoken with stressed intonation on the text (stressed intonation audio) are paired.

The normal audio corpus is learning data in which a text and a speech spoken normally (without stressed intonation) on the text (normal audio) are paired.

The audio guidance generation device 30 generates audio explaining the progress of the competition online, from the competition data, using the learned audio model, in the synthesis processing stage.

The audio guidance generation device 30 generates a text explaining the progress of the competition with a speech style indicating the stressed portion (text with the speech style) from the competition data, based on a template in which the part to be stressed of the competition data is determined in advance, and performs speech synthesis using the learned audio model.

Thus, the audio guidance generation device 30 can generate audio with a sharp intonation, from the competition data.

The audio guidance generation device 30 includes a message management unit 11, an explanation generation unit 12, a pre-learning unit 31, and a speech synthesis unit 34.

The pre-learning unit 31 learns various parameters constituting the audio model in the pre-learning stage.

The speech synthesis unit 34 generates audio (synthesized speech) from the competition data, using the learned audio model in the synthesis processing stage.

The audio guidance generation device 30 is connected to the corpus storage device 40 such that various data can be transmitted and received.

(Pre-Learning Unit)

Next, the configuration of the pre-learning unit 31 will be described with reference to FIG. 14. The pre-learning unit 31 includes a corpus input unit 32 and a model learning unit 33.

The corpus input unit 32 inputs a stressed intonation audio corpus and a normal audio corpus from the corpus storage device 40.

The corpus input unit 32 reads text and audio (in other words, stressed intonation audio or normal audio) in association with each other from the corpus storage device 40, and outputs the text and audio to the model learning unit 33. The corpus input unit 32 outputs the stressed intonation discrimination information indicating that the audio corresponding to the text read from the stressed intonation audio corpus is stressed intonation audio in association with the text and audio to the model learning unit 33. The corpus input unit 32 outputs the stressed intonation discrimination information indicating that the audio corresponding to the text read from the normal audio corpus is normal audio (is not stressed intonation audio) in association with the text and audio to the model learning unit 33.

The model learning unit 33 learns the time length model 346*a* and the acoustic feature model 346*b*, as the DNN audio model, using the text input from the corpus input unit 32, stressed intonation discrimination information, and audio (in other words, stressed intonation audio or normal audio). The model learning unit 33 includes a text analysis unit 331, an audio analysis unit 332, and a DNN learning unit 333.

The text analysis unit 331 analyzes the text to generate a language feature for each phoneme and frame, and generates labels (stressed intonation information and sentence ending information) for each phoneme that specifies the speech style, based on the stressed intonation discrimination information. The text analysis unit 331 includes a phoneme language feature generation unit 331*a* and a frame language feature generation unit 331*b*.

The phoneme language feature generation unit 331*a* generates a phoneme language feature that is a language feature for each of phonemes constituting the input text. The phoneme language feature indicates a feature depending on the context of the phoneme. For example, the phoneme language feature is one or a set of phoneme information (phoneme label including preceding and following phonemes), accent position, accent phrase information, part of speech information, exhalation paragraph information, and the like. Since these phoneme language features can be obtained by publicly known general text analysis (for example, morphological analysis, prosody estimation, or the like), the detailed description of the analysis method is omitted.

The phoneme language feature generation unit 331*a* adds speech style-specific labels (speech style label [stressed intonation information and sentence ending information]) indicating stressed intonation and ending a sentence with a noun phrase to the generated phoneme language feature.

In a case where the stressed intonation discrimination information which is input together with the text is information indicating that the audio is stressed intonation audio, the phoneme language feature generation unit 331*a* adds, as a speech style label, a label indicating the stressed intonation (stressed intonation information; with stressed intonation).

In a case where the stressed intonation discrimination information which is input together with the text is information indicating that the audio is normal audio (in other words, it is not stressed intonation audio), the phoneme language feature generation unit 331*a* adds, as a speech style label, a label indicating normal (stressed intonation information; without stressed intonation) to all phonemes constituting the text.

In a case where the part of speech of the sentence ending word of the input text is a noun, the phoneme language feature generation unit 331*a* adds, as a speech style label, a label indicating the ending a sentence with a noun phrase (sentence ending information; with ending a sentence with a noun phrase) to all phonemes constituting the sentence ending word. The phoneme language feature generation unit 331*a* adds a label indicating that it is not the ending a sentence with a noun phrase (sentence ending information; without ending a sentence with a noun phrase) to phonemes other than the phonemes to which a label indicating the ending a sentence with a noun phrase. The ending a sentence with a noun phrase means an expression form in which a part of speech of a word at the end of a sentence is a noun in a Japanese sentence. In Japanese sentences, a predicate is usually placed at the end of the sentence. As a predicate, words whose part of speech are a verb, an adjective, an adjective verb or an auxiliary verb are used. In other words, a sentence ended with a noun phrase can be regarded as an expression form in which the predicate representing the action or state of the noun at the end of the sentence is omitted. Therefore, the intonation may be different from the sentence in which the sentence ending word is a predicate. In general, the frequency of the ending a sentence with a noun phrase is rare in Japanese statements. However, in the statement used in sports live situation and the like, ending a sentence with a noun phrase tends to be used relatively frequently. The pre-learning unit 31 according to the present embodiment pays attention to this fact and uses the information indicating the presence or absence of ending a sentence with a noun phrase for the learning of audio model.

The phoneme language feature generation unit 331*a* outputs the phoneme language feature and the speech style labels (stressed intonation information and sentence ending information) to the frame language feature generation unit 331*b* and the time length model learning unit 333*a* of the DNN learning unit 333.

The phoneme language feature generation unit 331*a* outputs the analyzed phoneme-specific phoneme label to the phoneme separator 332*a* of the audio analysis unit 332 for each phoneme.

The frame language feature generation unit 331*b* generates a frame language feature that is a language feature corresponding to a frame constituting a time length section of the phoneme of the input text. A frame is a unit for generating an acoustic feature analyzed by the audio analysis unit 332.

The frame language feature is formed by including the temporal feature of the phoneme such as the numbers of frames constituting the time length section of the phoneme (that is, the position of the frame) and the total number of frames in the phoneme language feature generated by the phoneme language feature generation unit 331*a*. The frame language feature generation unit 331*b* generates the frame language feature corresponding to the phoneme time length for one phoneme.

The frame language feature generation unit 331*b* receives the phonemes time length from the audio analysis unit 332, and obtains the number of frames constituting the section of the phoneme time length, the total number of frames, and the like. The phoneme time length is, for example, the number of frames per phoneme.

The frame language feature generation unit 331*b* outputs the generated frame language features for the number of frames corresponding to one phoneme and the speech style label input from the phoneme language feature generation unit 331*a* in association with each other to the acoustic feature model learning unit 333*b* of the DNN learning unit 333.

The audio analysis unit 332 analyzes the input audio and generates a phoneme time length and an acoustic feature for each frame. The audio analysis unit 332 includes a phoneme separator 332*a* and an acoustic feature generation unit 332*b*.

The phoneme separator 332*a* detects a break of phoneme of the phoneme label input from the text analysis unit 331 in the speech waveform of the audio input to the corpus input unit 32.

The phoneme separator 332*a* detects a break position of phoneme using, for example, a segment dictionary (not shown) in which a phoneme is associated with a waveform of the phoneme.

The phoneme separator 332*a* outputs the detected break position of phoneme to the acoustic feature generation unit 332*b*.

The phoneme separator 332*a* obtains the time length of the phoneme corresponding to the phoneme label, based on the detected break position of phoneme, and outputs the time length to the frame language feature generation unit 331*b* of the text analysis unit 331, and the time length model learning unit 333*a* of the DNN learning unit 333.

The time length of the phoneme generated by the phoneme separator 332*a* is correct data when the time length model learning unit 333*a* learns the time length model 346*a*.

The acoustic feature generation unit 332*b* generates an acoustic feature for each frame of the input audio. The acoustic feature generation unit 332*b* generates acoustic features for the number of frames constituting the section of the time length of the phoneme. The acoustic feature generation unit 332*b* performs acoustic analysis by cutting out the input audio into a predetermined frame length (for example, 25 milliseconds) every predetermined frame period (for example, 5 milliseconds) in the section of the time length of phoneme based on the break position detected by phoneme separator 332*a*, and generates, as acoustic features, spectral coefficients (such as mel cepstrum coefficients), pitch (such as logarithmic pitch frequency), noise coefficient, voiced/unvoiced determination value, and the like.

For example, the acoustic feature generation unit 332*b* generates a total of 62 dimensional static characteristics including 60 dimensional spectral coefficient, one dimensional pitch, and one dimensional noise coefficient, 124-dimensional dynamic characteristics of the first-order difference and second-order difference in the time direction of static characteristics, and a total of 187 dimensional acoustic features consisting of one dimensional voiced/unvoiced determination values. Since these acoustic features can be obtained by general acoustic analysis, the detailed description about an analysis method is omitted.

The acoustic feature generation unit 332*b* outputs the generated acoustic feature to the acoustic feature model learning unit 333*b* of the DNN learning unit 333.

The acoustic feature generated by the acoustic feature generation unit 332*b* is correct data when the acoustic feature model learning unit 333*b* learns the acoustic feature model 346*b*.

The DNN learning unit 333 learns a time length model 346*a* and an acoustic feature model 346*b* as DNN audio models. The DNN learning unit 333 includes a time length model learning unit 333*a* and an acoustic feature model learning unit 333*b*.

The time length model learning unit 333*a* learns the time length model 346*a* as a DNN model that receives the phoneme language feature and the speech style labels (stressed intonation information and sentence ending information) and outputs the time length of the phoneme.

Figure 16:
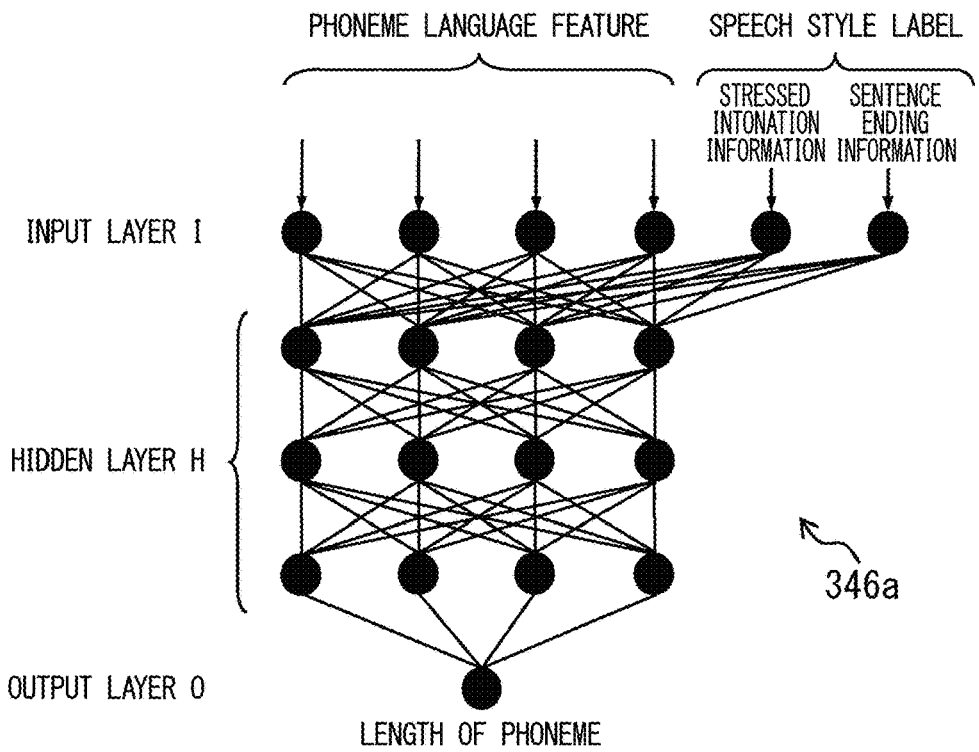
FIG. 16 is a diagram showing an example of a time length model according to the second embodiment.

FIG. 16 shows an example of the time length model 346*a* configured by DNN. As shown in FIG. 16, the time length model 346*a* can be configured by a feed forward neural network (FFNN) including an input layer I, a hidden layer H, and an output layer O.

The time length model learning unit 333*a* inputs to each unit of the input layer I of the time length model 346*a*, the phoneme language feature analyzed by the text analysis unit 331, and labels of the stressed intonation information (presence or absence of stressed intonation) and the sentence ending information (presence or absence of ending a sentence with a noun phrase) which are speech style labels. The time length model learning unit 333*a* propagates phoneme language features and values of speech style labels (stressed intonation information and sentence ending information) input to the input layer I with weights, and learns the parameters to be weights in the time length model 346*a* such that the output from the output layer O becomes the time length of the phoneme analyzed by the audio analysis unit 332. For parameter learning, for example, an error back propagation method can be used.

The time length model learning unit 333*a* sequentially updates the time length model 346*a* stored in the model storage unit 346 to the time length model 346*a*.

The acoustic feature model learning unit 333*b* learns the acoustic feature model 346*b* as a DNN model that receives the frame language feature and the speech style labels (stressed intonation information and sentence ending information) and outputs an acoustic feature for each phoneme frame.

Figure 17:
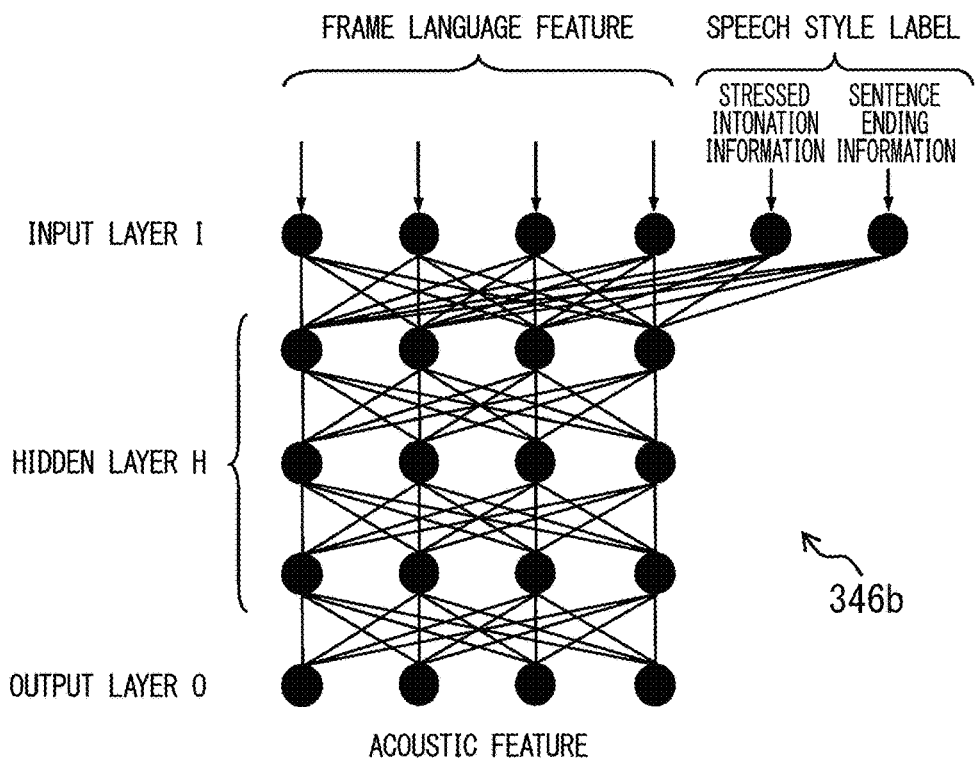
FIG. 17 is a diagram showing an example of an acoustic feature model according to the second embodiment.

FIG. 17 shows an example of the acoustic feature model 346*b* configured by DNN. As shown in FIG. 17, the acoustic feature model 346*b* can be configured by a forward propagation neural network (FFNN) including an input layer I, a hidden layer H, and an output layer O.

The acoustic feature model learning unit 333*b* inputs to each unit of the input layer I of the acoustic feature model 346*b*, the frame language feature analyzed by the text analysis unit 331, and labels of the stressed intonation information (presence or absence of stressed intonation) and sentence ending information (presence or absence of ending a sentence with a noun phrase) which are speech style labels. The acoustic feature model learning unit 333*b* propagates each value of frame language feature and speech style labels (stressed intonation information and sentence ending information) input to the input layer I with weights, and learns the parameters to be weights in the acoustic feature model 346*b* such that the output from the output layer O becomes the acoustic feature of the frame analyzed by the audio analysis unit 332. For parameter learning, the error back propagation method can be used as in the time length model 346a.

The acoustic feature model learning unit 333b sequentially updates the acoustic feature model 346b stored in the model storage unit 346 to the acoustic feature model 346b obtained by learning.

The model storage unit 346 stores the audio model (in other words, the time length model 346a and the acoustic feature model 346b) learned by the model learning unit 33. The model storage unit 346 can be configured by a general storage medium such as a semiconductor memory.

The audio model (in other words, the time length model 346a and the acoustic feature model 346b) learned in the pre-learning stage, stored in the model storage unit 346, is used by the synthesized speech generation unit 341.

The pre-learning unit 31 described above can generate an audio model in which the phoneme time length and the acoustic feature are learned in audio of which intonation is stressed than normal audio, and audio of ending a sentence with a noun phrase, in addition to normal audio.

Next, another example of the competition data will be described with reference to FIGS. 18 and 19.

The competition data is, for example, data corresponding to the players participating in the competition (FIG. 18), and competition content and competition progress such as a list of events that occur during the competition (FIG. 19. FIGS. 18 and 19 show examples of competition data for tennis, as an example.

FIG. 18 shows that [full name of player A] is "A1·A2", [family name of player A] is "A2", and the like.

Further, FIG. 19 shows that the 123rd event occurred at [time] O hour Δ minute □ second. [Set] indicates the number of game sets. The competition data is sequentially added in the message management unit 11 every time the event is updated. Here, the 123rd event occurs during the fourth set ("4S"). [Game count] indicates that the game count has been updated. Here, it indicates that "B2" (player B) has the fifth point ("5") [Unforced error] indicates that an unforced error has occurred. Here, "A2" (player A) has made an unforced error, and the unforced error is the "twelfth" error. [Break Success] indicates that the break has been successful. Here, "B2" (player B) has succeeded in the "sixth" break.

Further, FIG. 19 illustrates [total number of games], [number of games acquired by player A], [number of games acquired by player B], [number of breaks of player B], and the like as situation of the competitions.

Of course, the competition data illustrated in FIGS. 18 and 19 is not limited to this, and the competition data may differ depending on the type of competition.

The explanation generation unit 12 stores in advance an explanatory template for converting the competition data into text for speech synthesis. A template storage unit (not shown) that stores the explanatory template can be configured by a general storage medium such as a semiconductor memory.

The template storage unit stores a plurality of explanatory templates in association with conditions indicating predetermined data in the competition data.

For example, FIG. 20 shows a template when the player A causes an unforced error and the player B succeeds in the break, in the competition data shown in FIG. 18.

In the explanatory template shown in FIG. 20, the portion interposed between "[" and "]" changes according to the competition data.

In this explanatory template, a portion where speech is stressed and uttered is indicated by a predetermined tag. For example, as shown in FIG. 20, a portion interposed between <stressed intonation> tag and </stressed intonation> tag is set as a stressed intonation target. Here, an example of stressing "[number of breaks of player B] KAIME NO BREEKU" is shown.

In the explanatory template, the presence or absence of the stressed intonation may be controlled by further adding conditions to the conditions shown in FIG. 20.

For example, as shown in FIG. 21, in addition to the case where the player A has caused an unforced error and the player B has succeeded in the break shown in FIG. 20), the explanatory template used in the case where the number of breaks of the player B is a predetermined number (for example, "5") or more is the explanatory template that stresses "[number of breaks of player B] KAIME NO BUREEKU" is stressed intonation, as in FIG. 20.

The explanatory template used in a case where the number of breaks of the player B is less than a predetermined number (for example, "5") is, as shown in FIG. 22, the explanatory template obtained by deleting <stressed intonation> tag and </stressed intonation> tag from the explanatory template shown in FIG. 21.

The explanation generation unit 12 converts the competition data input to the message management unit 11 into an explanatory text for performing speech synthesis, using the explanatory template stored in advance.

For example, the explanation generation unit 12 receives the competition data illustrated in FIGS. 18 and 19, reads an explanatory template in which various data matches the conditions, and embeds a character string depending on the competition data. In a case where competition data is updated, the explanation generation unit 12 generates an explanatory text from the updated content.

For example, when receiving the competition data (here, the 123rd event) shown in FIG. 19, the explanation generation unit 12 embeds a character string in the explanatory template shown in FIG. 20 or FIG. 21 to generates the explanatory text shown in FIG. 23.

When using the explanatory template shown in FIG. 22, the explanation generation unit 12 generates the explanatory text illustrated in FIG. 24.

As a result, the explanation generation unit 12 can generate, as the explanatory text, the text with the speech style indicating the portion to be stressed in the text as the speech style with the tag.

The explanation generation unit 12 outputs the generated text with the speech style to the speech synthesis unit 13.

(Speech Synthesis Unit)

Next, the configuration of the speech synthesis unit 13 will be described. In the example illustrated in FIG. 13, the speech synthesis unit 13 includes a synthesized speech generation unit 341 and a model storage unit 346.

The synthesized speech generation unit 341 uses the learned audio model stored in the model storage unit 346 (in other words, the time length model 346a and the acoustic feature model 346b) to perform speech synthesis processing on the text with the speech style generated by the explanation generation unit 12.

Figure 15:
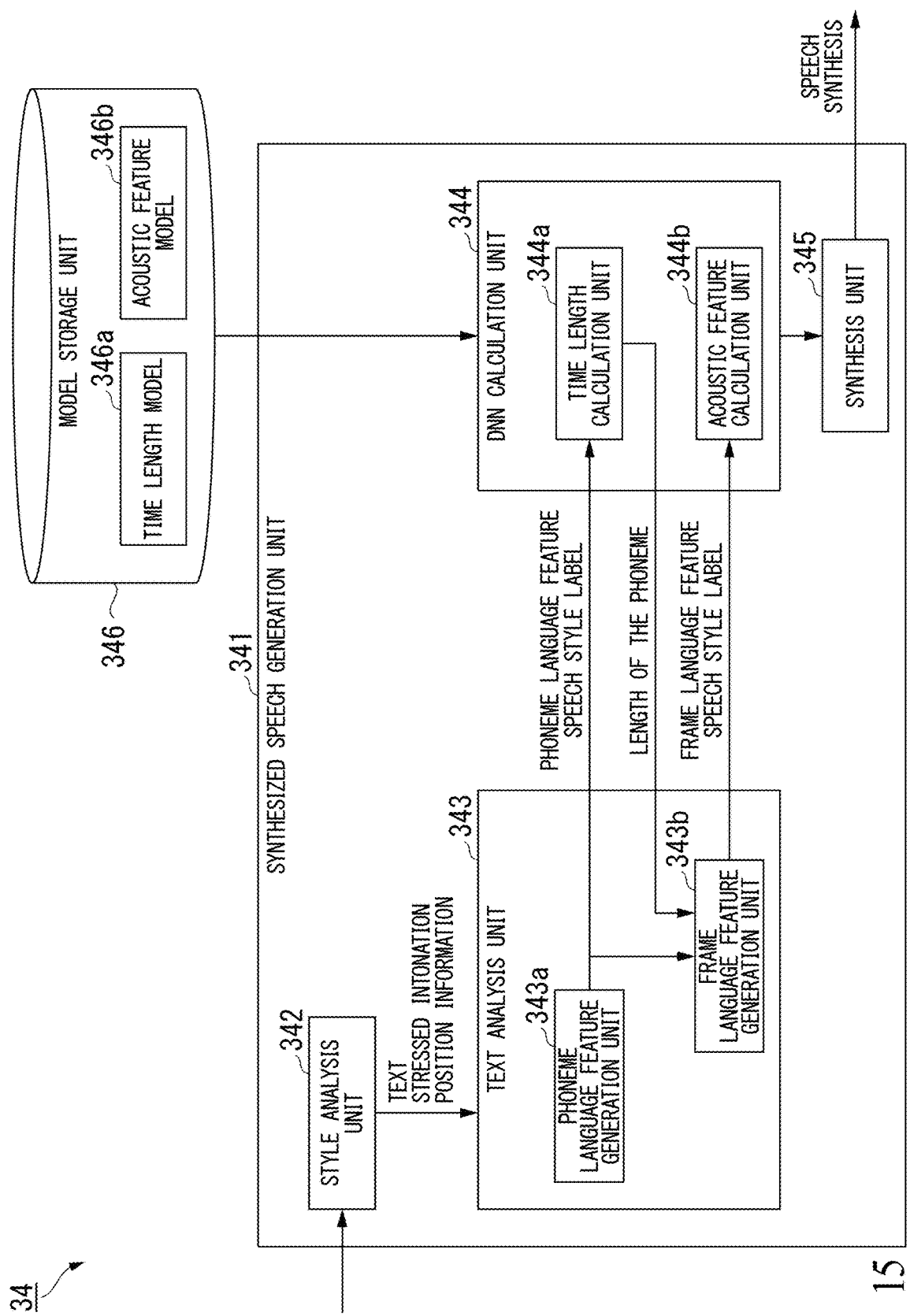
FIG. 15 is a block diagram illustrating a configuration example of a speech synthesis unit according to the second embodiment.

In the example illustrated in FIG. 15, the synthesized speech generation unit 341 includes a style analysis unit 342, a text analysis unit 343, a DNN calculation unit 344, and a synthesis unit 345.

The style analysis unit 342 analyzes the stressed portion in the text with the speech style generated by the explanation generation unit 12.

The style analysis unit 342 specifies a stressed portion in the sentence by detecting tags (<stressed intonation> and </stressed intonation>) determined in advance for each sentence in the text with the speech style. The style analysis unit 342 outputs in units of sentences, the text in which the tag is deleted from the text with the speech style and stressed intonation position information indicating the stressed portion in the text, to the text analysis unit 343. When there is no predetermined tag in the text with the speech style, the style analysis unit 342 outputs, to the text analysis unit 343, the text and the stressed intonation position information indicating that there is no stressed portion, in units of sentences.

The text analysis unit 343 analyzes the text to generate a language feature for each phoneme and frame, and generates a label for each phoneme that specifies the speech style based on the stressed position information. The text analysis unit 343 includes a phoneme language feature generation unit 343a and a frame language feature generation unit 343b.

The phoneme language feature generation unit 343a generates a phoneme language feature that is a language feature for each of phonemes constituting the input text. The phoneme language feature indicates a feature of a phoneme. The phoneme language feature generation unit 343a adds speech style-specific labels indicating stressed intonation and ending a sentence with a noun phrase (speech style labels [stressed intonation information and sentence ending information]) to the generated phoneme language feature. The phoneme language feature generation unit 343a has the same function as the phoneme language feature generation unit 331a described with reference to FIG. 14.

The phoneme language feature generation unit 331a adds, as a speech style label, a label indicating the stressed intonation (with stressed intonation), to all phonemes constituting the text corresponding to the stressed intonation audio. On the other hand, the phoneme language feature generation unit 343a adds, as a speech style label, a label indicating the stressed intonation (stressed intonation information; with stressed intonation), to phonemes corresponding to the stressed portion indicated by the stressed intonation position information analyzed by the style analysis unit 342, and adds a label indicating that it is not the stressed intonation (stressed intonation information; without stressed intonation) to the other phonemes.

The phoneme language feature generation unit 343a outputs the phoneme language feature and the speech style labels (the stressed intonation information and the sentence ending information) to the frame language feature generation unit 343b and the time length calculation unit 344a of the DNN calculation unit 344.

The frame language feature generation unit 343b generates a frame language feature that is a language feature corresponding to a frame constituting the section of the time length of the phoneme of the input text. The frame language feature generation unit 343b has the same function as the frame language feature generation unit 331b described with reference to FIG. 14.

Figure 14:
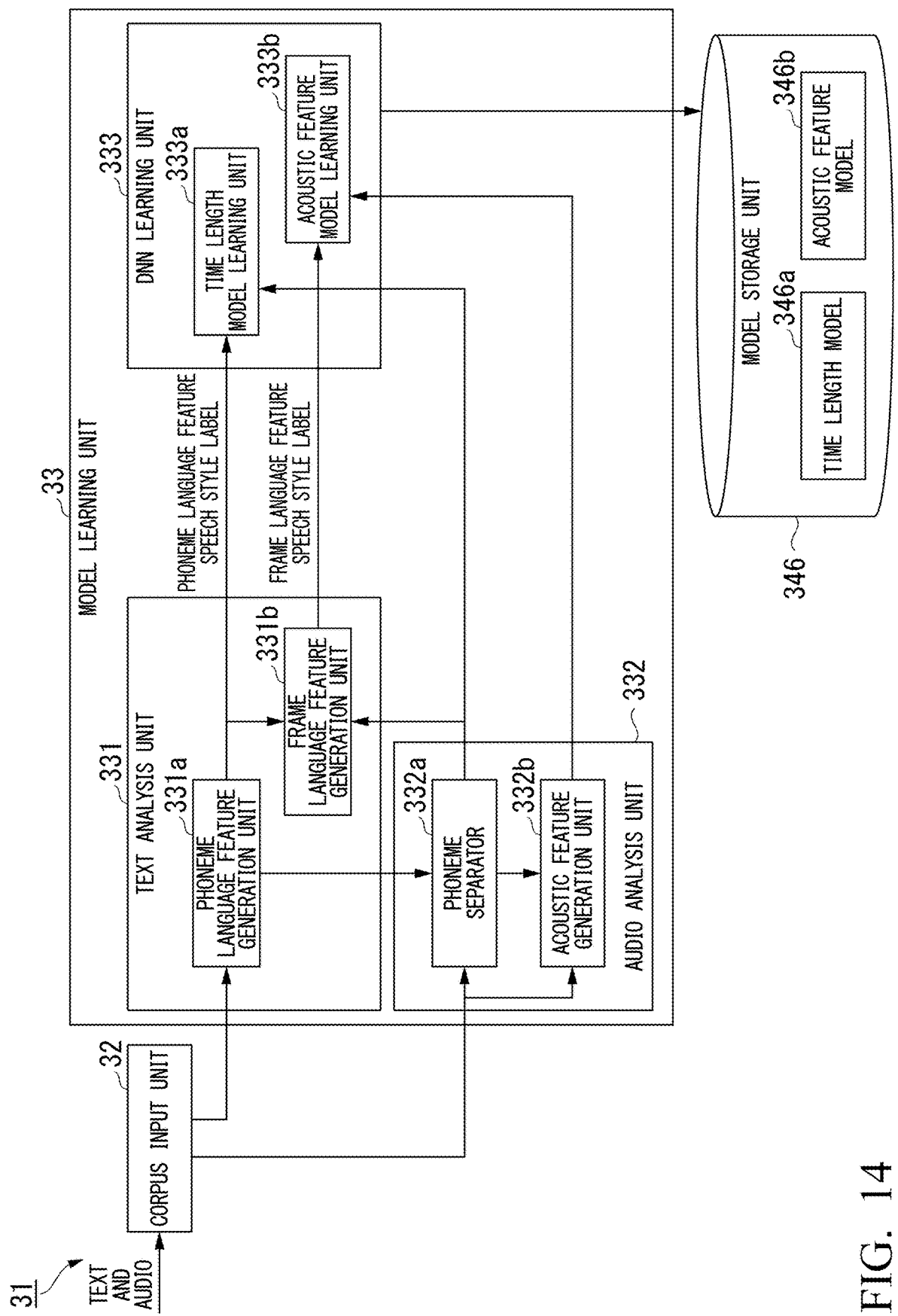
FIG. 14 is a block diagram illustrating a configuration example of a pre-learning unit according to the second embodiment.

The frame language feature generation unit 343b receives the phoneme language feature generated by the phoneme language feature generation unit 343a and the time length of the phoneme generated by the time length calculation unit 344a of the DNN calculation unit 344 to generate the frame language feature in the same manner as the frame language feature generation unit 331b (FIG. 14).

The frame language feature generation unit 343b outputs the generated frame language feature with the speech style label input from the phoneme language feature generation unit 343a in association with each other to the acoustic feature calculation unit 344b of the DNN calculation unit 344.

The DNN calculation unit 344 calculates DNN using the audio models (time length model 346a and acoustic feature model 346b) stored in the model storage unit 346. The DNN calculation unit 344 includes a time length calculation unit 344a and an acoustic feature calculation unit 344b.

The time length calculation unit 344a generates the time length of the phoneme from the phoneme language feature and the speech style labels (stressed intonation information and sentence ending information) using the learned time length model 346a.

For example, the time length calculation unit 344a inputs the phoneme language feature and the speech style labels (the stressed intonation information and the sentence ending information) to each unit of the input layer I of the time length model 346a shown in FIG. 16. The time length calculation unit 344a calculates DNN using the parameters of the learned time length model 346a, and sets the value output from the output layer O as the time length of the phoneme.

The time length calculation unit 344a outputs the generated phoneme time length to the frame language feature generation unit 343b of the text analysis unit 343.

The acoustic feature calculation unit 344b uses the learned acoustic feature model 346b to generate an acoustic feature for each phoneme frame, from the frame language feature and the speech style labels (the stressed intonation information and the sentence ending information).

The acoustic feature calculation unit 344b inputs the frame language feature and the speech style labels (the stressed intonation information and the sentence ending information) to each unit of the input layer I of the acoustic feature model 346b shown in FIG. 17, for example. The acoustic feature calculation unit 344b calculates DNN using the parameters of the learned acoustic feature model 346b, and sets the value output from the output layer O as the acoustic feature.

The acoustic feature calculation unit 344b outputs the generated acoustic feature for each frame to the synthesis unit 345.

The synthesis unit 345 performs speech synthesis using the acoustic feature for each frame generated by the acoustic feature calculation unit 344b of the DNN calculation unit 344, and generates synthesized speech.

The synthesis unit 345 generates a vocal cord sound source waveform that expresses the temporal change of the pitch, loudness, and noise level of the voice, based on information (sound source parameters) such as pitch and noise characteristics included in the acoustic feature. The synthesis unit 345 generates a vocal tract filter expressing differences in phonemes and voice quality, based on information (spectrum parameters) such as a spectrum coefficient included in the acoustic feature for each frame. The synthesis unit 345 generates a speech waveform corresponding to the frame, using the vocal cord sound source waveform as an input to the vocal tract filter.

Since as a method of performing speech synthesis using an acoustic feature, a publicly known vocoder method may be used, a detailed description thereof is omitted here.

The synthesis unit 345 generates a synthesized speech by connecting the speech waveform of each frame, and outputs audio description data indicating the generated synthesized speech.

By configuring the synthesized speech generation unit 341 as described above, the audio guidance generation device 30 uses the audio model pre-learned by the pre-learning unit 31 can generate, from the competition data, a synthesized speech that expresses stressed intonation and ending a sentence with a noun phrase that can be used as a sports live.

Figure 25:
FIG. 25 is a diagram showing an example of intonation of synthesized speech generated according to the second embodiment.

For example, when speech synthesis is performed without learning stressed intonation, as shown in FIG. 25, audio having a flat pitch is usually synthesized as a speech representing "KONO SETTO 6 KAIME NO BUREEKU". In addition, when speech synthesis is performed without learning the ending a sentence with a noun phrase, as shown in FIG. 25, a down tone speech is usually synthesized such as a speech representing "BUREEKU" at the end of a sentence. In FIG. 25, a general voice pitch L is shown on the character string.

Figure 26:
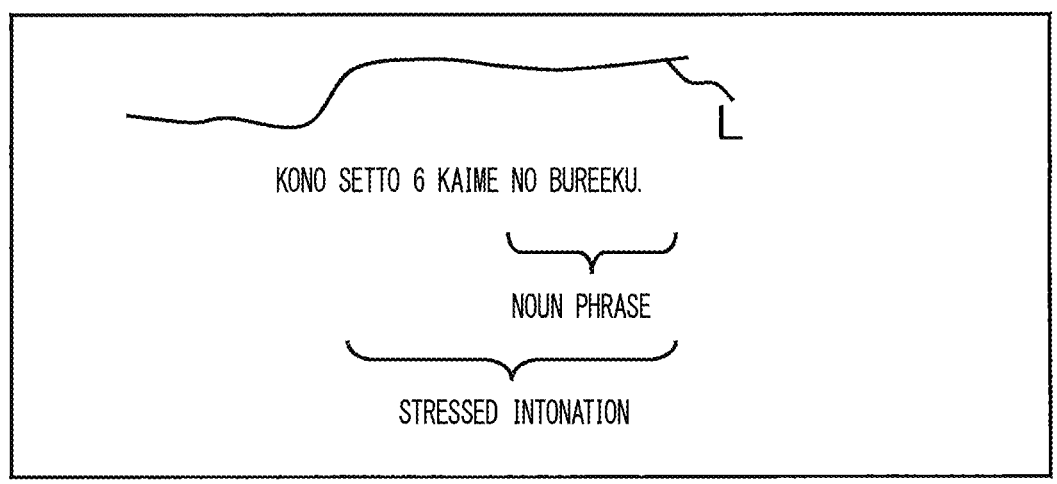
FIG. 26 is a diagram showing another example of intonation of synthesized speech generated according to the second embodiment.

On the other hand, since the audio guidance generation device 30 uses an audio model obtained by learning stressed intonation and ending a sentence with a noun phrase, as shown in FIG. 26, the pitch of the speech representing the "6 KAIME NO BUREEKU", which is the stressed portion, increases, and the pitch of the speech representing the "BUREEKU" of end of the sentence, which is the ending of a sentence with a noun phrase, is raised.

The configuration of the audio guidance generation device 30 according to the embodiment of the present invention has been described above. However, the audio guidance generation device 30 can be operated by a program (speech synthesis program) for causing a computer to function as each unit described above.

(Operation of Audio Guidance Generation Device)

Figure 27:
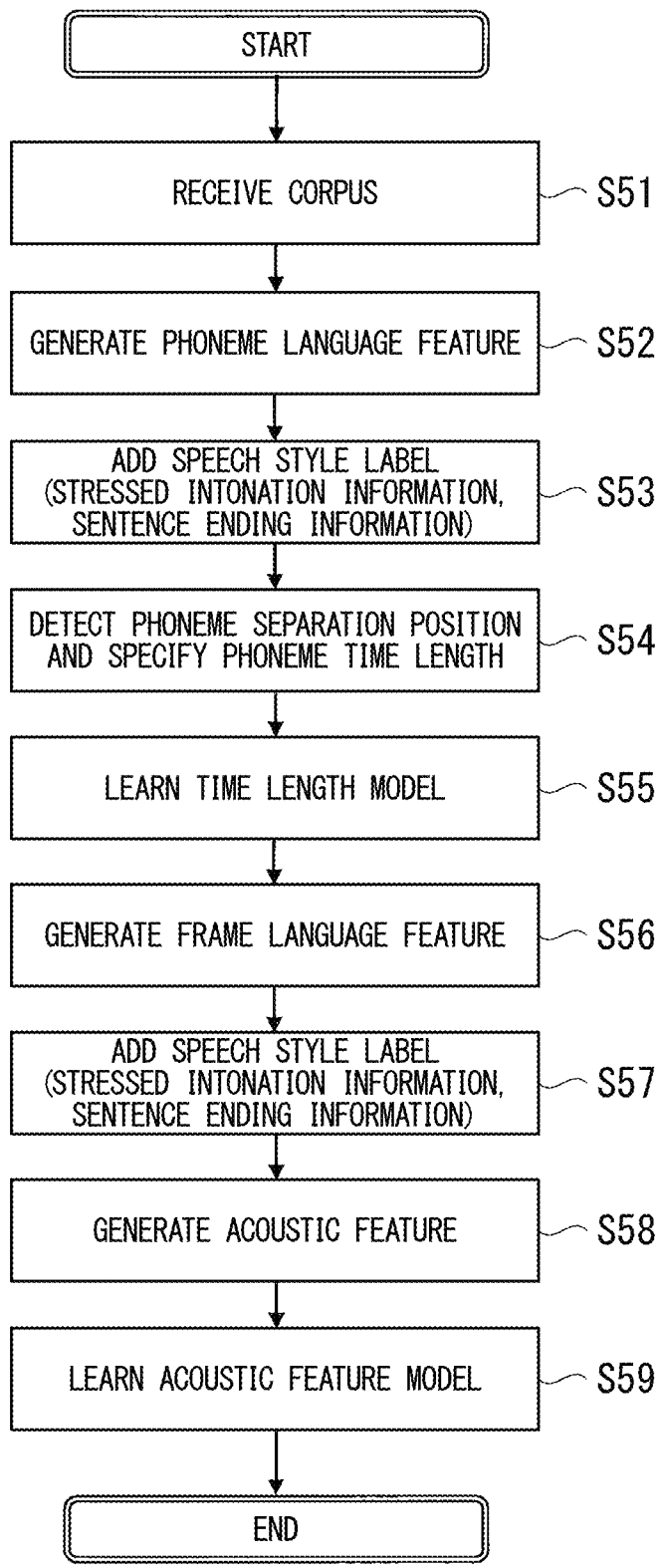
FIG. 27 is a flowchart illustrating an example of pre-learning according to the second embodiment.
Figure 28:
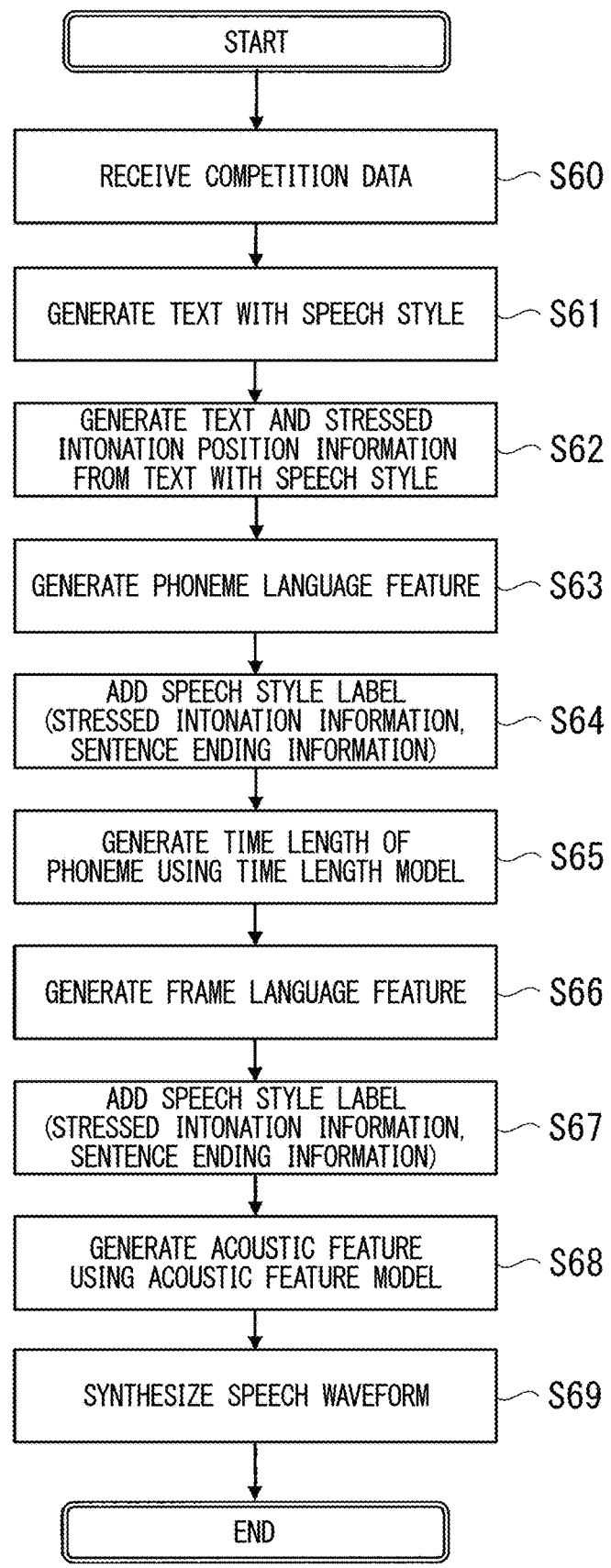
FIG. 28 is a flowchart illustrating an example of audio description generation processing according to the second embodiment.

Next, with reference to FIG. 27 and FIG. 28, the operation of the audio guidance generation device 30 according to the embodiment of the present invention will be described. Here, the operation of the audio guidance generation device 30 will be described separately for the operation of the pre-learning unit 31 and the operation of the synthesized speech generation unit 341.

(Pre-Learning)

First, with reference to FIG. 27, the operation of the pre-learning unit 31 of the audio guidance generation device 30 will be described.

(Step S51) The corpus input unit 32 receives a corpus from the corpus storage device 40, with the text and audio (stressed intonation audio or normal audio) as a pair. Here, the corpus input unit 32 adds stressed intonation discrimination information indicating that the text corresponds to the stressed intonation audio, to the text corresponding to the stressed intonation audio. The corpus input unit 32 adds stressed intonation discrimination information indicating that the text is not the stressed intonation audio, to the text corresponding to the normal audio.

(Step S52) The phoneme language feature generation unit 331*a* of the text analysis unit 331 analyzes the text input in step S51, and generates a language feature (phoneme language feature) for each phoneme constituting the text.

(Step S53) The phoneme language feature generation unit 331*a* adds a speech style label to the phoneme language feature generated in step S52. In a case where the stressed intonation discrimination information indicating that the text is stressed intonation audio is added to the text, the phoneme language feature generation unit 331*a* adds, as a speech style label, a label indicating the stressed intonation (stressed intonation information; with stressed intonation). In a case where the stressed intonation discrimination information indicating that the text is not the stressed intonation audio is added to the text, the phoneme language feature generation unit 331*a* adds, as a speech style label, a label indicating normal (stressed intonation information; without stressed intonation).

The phoneme language feature generation unit 331*a* adds, as the speech style label, a label indicating ending a sentence with a noun phrase (sentence ending information; with ending a sentence with a noun phrase), to the phoneme language feature, with respect to phonemes corresponding to words of which part of speech of sentence ending words are nouns. The phoneme language feature generation unit 331*a* adds, as the speech style label, a label indicating that it is not the ending a sentence with a noun phrase (sentence ending information; without ending a sentence with a noun phrase), to the phoneme language feature, with respect to phonemes corresponding to words other than the sentence ending words, or words which are sentence ending words but are not nouns.

(Step S54) The phoneme separator 332*a* of the audio analysis unit 332 detects the break position of phoneme of the speech input in step S51, and obtains the phoneme time length.

(Step S55) The time length model learning unit 333*a* of the DNN learning unit 333 receives the phoneme language feature generated in step S52 and the speech style label added in step S53, and learns the time length model 346*a* such that the time length of the phoneme obtained in step S54 is to be output.

(Step S56) The frame language feature generation unit 331*b* of the text analysis unit 331 generates the language feature (frame language feature) of the frames constituting the section of the phoneme time length, based on the phoneme time length obtained in step S54.

(Step S57) The frame language feature generation unit 331*b* adds the same speech style label as the speech style label added to the phoneme language feature in step S53 to the frame language feature generated in step S56.

(Step S58) The acoustic feature generation unit 332*b* of the audio analysis unit 332 generates an acoustic feature of the frame based on the break position of phoneme obtained in step S54 for the audio input in step S51.

(Step S59) The acoustic feature model learning unit 333*b* of the DNN learning unit 333 receives the frame language feature generated in step S56 and the speech style label added in step S57, and learns the acoustic feature model 346*b* such that the acoustic feature generated in step S58 is to be output. Then, the pre-learning unit 31 ends the process of FIG. 27.

(Audio Description Generation Processing)

Next, with reference to FIG. 28, the operation related to the audio description generation processing of the audio guidance generation device 30 will be described.

(Step S60) The message management unit 11 receives competition data from the outside of the audio guidance generation device 30.

(Step S61) The explanation generation unit 12 generates a text with the speech style from unsent competition data among the competition data input in step S60, based on the explanatory template stored in advance in a template storage unit (not shown). In this template, predetermined tags (<stressed intonation>, </stressed intonation>) are added to locations where speech is to be uttered with stressed intonation (see FIG. 23). The explanation generation unit 12 generates a text with a speech style, by replacing the variable part of the explanatory template with information specified by the competition data (see FIG. 23).

(Step S62) The style analysis unit 342 of the synthesized speech generation unit 341 analyzes the text with the speech style generated in step S61, and generates the text from which the tag has been deleted and the stressed intonation position information indicating the stressed portion in the text designated by the tag.

(Step S63) The phoneme language feature generation unit 343a of the text analysis unit 343 analyzes the text generated in step S62, and generates a language feature (phoneme language feature) for each phoneme constituting the text.

(Step S64) The phoneme language feature generation unit 343a adds a speech style label to the phoneme language feature generated in step S63. Here, the phoneme language feature generation unit 343a adds, as a speech style label, a label indicating the stressed intonation (stressed intonation information; with stressed intonation), to phonemes corresponding to the stressed portion for which stressed intonation is designated, based on the stressed intonation position information, and adds a label indicating that it is not the stressed intonation (stressed intonation information; without stressed intonation) to the other phonemes.

With respect to phonemes corresponding to words of which part of speech of sentence ending words are nouns, the phoneme language feature generation unit 343a adds, as the speech style label, a label indicating ending a sentence with a noun phrase (sentence ending information; with ending a sentence with a noun phrase), to the phoneme language feature. With respect to phonemes corresponding to words other than the sentence ending words, or words which are sentence ending words but are not nouns, the phoneme language feature generation unit 343a adds, as the speech style label, a label indicating not ending a sentence with a noun phrase (sentence ending information; without ending a sentence with a noun phrase), to the phoneme language feature.

(Step S65) The time length calculation unit 344a of the DNN calculation unit 344 uses the learned time length model 346a to generate a time length of the phoneme, from the phoneme language feature generated in step S63 and the speech style label added in step S64.

(Step S66) The frame language feature generation unit 343b of the text analysis unit 343 generates the language feature (frame language feature) of the frames constituting the section of the phoneme time length, based on the phoneme time length generated in step S65.

(Step S67) The frame language feature generation unit 343b adds the same speech style label as the speech style label added to the phoneme language feature in step S64 to the frame language feature generated in step S66.

(Step S68) The acoustic feature calculation unit 344b of the DNN calculation unit 344 uses the learned acoustic feature model 346b to generate the acoustic feature of the frame from the frame language feature generated in step S66 and the speech style label added in step S67.

(Step S69) The synthesis unit 345 performs speech synthesis using the acoustic feature of the frame generated in step S68, and outputs audio description data indicating the generated synthesized speech. Thereafter, the audio guidance generation device 30 ends the process of FIG. 28.

With the above-described operation, the audio guidance generation device 30 can generate a synthesized speech that expresses stressed intonation and ending a sentence with a noun phrase that can be used as a sporting live, from the competition data.

As described above, the audio guidance generation device 30 according to the present embodiment is an audio guidance generation device 30 which receives a language feature for each phoneme and stressed intonation information indicating the presence or absence of the stressed intonation on the phoneme by using a deep neural network, and synthesizes the audio of the competition content from the competition data, by using a pre-learned time length model for outputting a time length of the phoneme, and a pre-learned acoustic feature model which receives a language feature for each frame of the phoneme, and stressed intonation information indicating the presence or absence of the stressed intonation on the frame, and outputs the acoustic feature of the frame, and the audio guidance generation device 30 includes an explanation generation unit 12, a phoneme language feature generation unit 343a, a time length calculation unit 344a, a frame language feature generation unit 343b, an acoustic feature calculation unit 344b, and a synthesis unit 345.

In such a configuration, the audio guidance generation device 30 uses the explanation generation unit 12 to generate a text indicating the stressed portion from the competition data, using a text template in which the stressed portion is predetermined for the competition data.

In the audio guidance generation device 30, the phoneme language feature generation unit 343a generates a language feature for each phoneme and stressed intonation information on the phoneme, by performing a morphological analysis, prosodic estimation, and the like on the text generated by the explanation generation unit 12.

In the audio guidance generation device 30, the time length calculation unit 344a calculates the phoneme language feature and the stressed intonation information generated by the phoneme language feature generation unit 343a as the input of the time length model to generate a time length of the phoneme.

In the audio guidance generation device 30, the frame language feature generation unit 343b generates a language feature for each frame of the phoneme, from the time length of the phoneme generated by the time length calculation unit 344a and the language feature of the phoneme generated by the phoneme language feature generation unit 343a, and associates the generated language feature with the stressed intonation information of the phoneme corresponding to the frame. Thus, the language feature and the stressed intonation information for each frame constituting the time length section of the phoneme are associated with each other.

In the audio guidance generation device 30, the acoustic feature calculation unit 344b calculates the frame language feature generated by the frame language feature generation unit 343b and the stressed intonation information corresponding to the frame as the input of the acoustic feature model to generate the acoustic feature for each frame.

The audio guidance generation device 30 uses the synthesis unit 345 to perform speech synthesis by using the acoustic feature for each frame generated by the acoustic feature calculation unit 344b.

Thus, the audio guidance generation device 30 can generate a synthesized speech in which the stressed portions in the text are stressed using an acoustic feature model in which the features of the stressed intonation audio are learned in advance.

The audio guidance generation device 30 can be operated by an audio description generation program for causing a computer to function as each unit of the audio guidance generation device 30.

According to the present embodiment, it is possible to generate a text specifying a portion to be stressed, from the competition data, and generate a synthesized speech in which the portion is stressed.

Thus, in the present embodiment, it is possible to generate audio which can express an intent with a clear inflection, from the competition data.

Modification Example

Although the configuration and operation of the audio guidance generation device 30 according to the embodiments of the present invention are illustrated in the above, the present invention is not limited to this example.

The audio guidance generation device 30 performs two operations of pre-learning for learning an audio model (the time length model 346a and the acoustic feature model 346b) and synthesis processing for synthesizing speech from competition data using the audio model, by one device. However, these operations may be performed by separate devices.

Specifically, the pre-learning unit 31 shown in FIG. 13 can be separated as an independent audio model learning device, as a device that pre-learns an audio model. In this case, the audio model learning device (the pre-learning unit 31) can be operated with a program (audio model learning program) causing the computer to function as each unit of the audio model learning device described in the pre-learning unit 31.

In the audio model generation apparatus, the model learning unit 33 that learns the time length model and the acoustic feature model of a deep neural network used in the synthesized speech generation unit 341, using a text, a speech uttered with stressed intonation on the text, and a speech uttered without stressed intonation, is configured to include a phoneme language feature generation unit 331a, a phoneme separator 332a, a time length model learning unit 333a, a frame language feature generation unit 331b, an acoustic feature generation unit 332b, and an acoustic feature model learning unit 333b.

In such a configuration, the phoneme language feature generation unit 331a performs analysis such as morphological analysis and prosody estimation on the text, and generates language feature for each phoneme and stressed intonation information indicating the presence or absence of the stressed intonation for the phoneme, depending on whether the text corresponds to the stressed audio.

The phoneme separator 332a detects break for each phoneme from the audio corresponding to the text, and specifies the time length of the phoneme.

The time length model learning unit 333a learns a time length model so as to receive the phoneme language feature and the stressed intonation information generated by the phoneme language feature generation unit 331a and output the phoneme time length specified by the phoneme separator 332a.

The frame language feature generation unit 331b generates a language feature for each frame of phoneme, from the phoneme time length specified by the phoneme separator 332a and the language feature generated by the phoneme language feature generation unit 331a, and associates the generated language feature with phoneme stressed intonation information corresponding to the frame.

The acoustic feature generation unit 332b generates an acoustic feature for each frame constituting a section of the phoneme time length from the audio corresponding to the text, based on the break of phoneme detected by the phoneme separator 332a.

The acoustic feature model learning unit 333b learns an acoustic feature model so as to receive the frame language feature generated by the frame language feature generation unit 331b and the stressed intonation information and output the acoustic feature generated by the acoustic feature generation unit 332b.

Thus, the audio model learning device can generate a model that learns a time length and an acoustic feature of a phoneme that differs depending on the stressed intonation information even if the text is the same.

On the other hand, the pre-learning unit 31 may be omitted from the audio guidance generation device 30 illustrated in FIG. 13 as a device that performs speech synthesis from the competition data. In this case, the audio guidance generation device 30 can cause the computer to operate with a program (audio description generation program) for executing processing of each unit of the message management unit 11, the explanation generation unit 12, and the speech synthesis unit 34.

In this way, since the pre-learning operation for learning the audio model and the synthesis processing operation from the reception of competition data to the speech synthesis using the audio model are operated on different devices, the audio model obtained by learning with one audio model learning device (pre-learning unit 31) can be used by a plurality of audio guidance generation devices 30.

Here, it has been described that the audio guidance generation device 30 generates a synthesized speech that realizes stressed intonation and ending a sentence with a noun phrase as a speech style, but the present invention is not limited thereto.

For example, the audio guidance generation device 30 may generate a synthesized speech that realizes only stressed intonation as a speech style.

In this case, as the time length model 346a and the acoustic feature model 346b, a model in which the sentence ending information (label indicating the presence or absence of ending a sentence with a noun phrase) is omitted from the input layer I of the time length model 346a shown in FIG. 16 and the sentence ending information is omitted from the input layer I of the acoustic feature model 346b shown in FIG. 17 may be used. The sentence ending information may be omitted from the speech style label output from the text analysis unit 331 to the DNN learning unit 333. The sentence ending information may be omitted from the speech style label output from the text analysis unit 343 to the DNN calculation unit 344.

Third Embodiment

Next, a third embodiment of the present invention will be described. The following description mainly focuses on differences from the above-described embodiments. The same constituent elements and processes as in the above embodiments are denoted by the same reference numerals, and the description is used.

When providing a live broadcast program such as a sports competition, the above-described broadcasting system 1 may receive both the distribution stream and the competition data by separate means or paths. The distribution stream includes video data that regularly represents the situation of the competition and live audio data that represents the background sound. The competition data can be distributed sporadically according to the occurrence of a competition or an event outside the competition. A transmission delay occurs in the transmission path where these data are distributed from the competition venue to the installation location of the equipment of the broadcasting system 1. The amount of delay and fluctuation characteristics of the transmission delay depend on the transmission path.

Even if both the distribution stream and the competition data are distributed synchronously through a single transmission line, a processing time from receiving the distribution stream until it can be sent to receiving device 20 is generally different from a processing time required to generate audio description data based on the competition data and multiplex it with the distribution stream including live audio data indicating the background sound after receiving the competition data. Since the time required for the speech synthesis processing depends on the utterance length, the processing time is not constant and can vary.

For these reasons, in the broadcasting system 1, the occurrence of an event appearing in the video or background sound provided to the receiving device 20 and the guidance audio indicated by the audio description data generated based on the competition data may not be synchronized. Therefore, the guidance audio may be delayed with respect to the event. In some cases, the guidance audio may be provided before the video representing the uttered event or background sound.

Since the delay times related to the distributions of the competition data can be different individually, when the operation of the distribution means and the transmission path are unstable, it may be received in an order different from the occurrence of the event. If the audio description data is sequentially generated based on the competition data and distributed as it is, the audio description data is provided in an order different from the order in which the events originally have occurred. This also causes a difference from the order of events indicated by the distribution stream formed of video data and original audio data.

Figure 29:
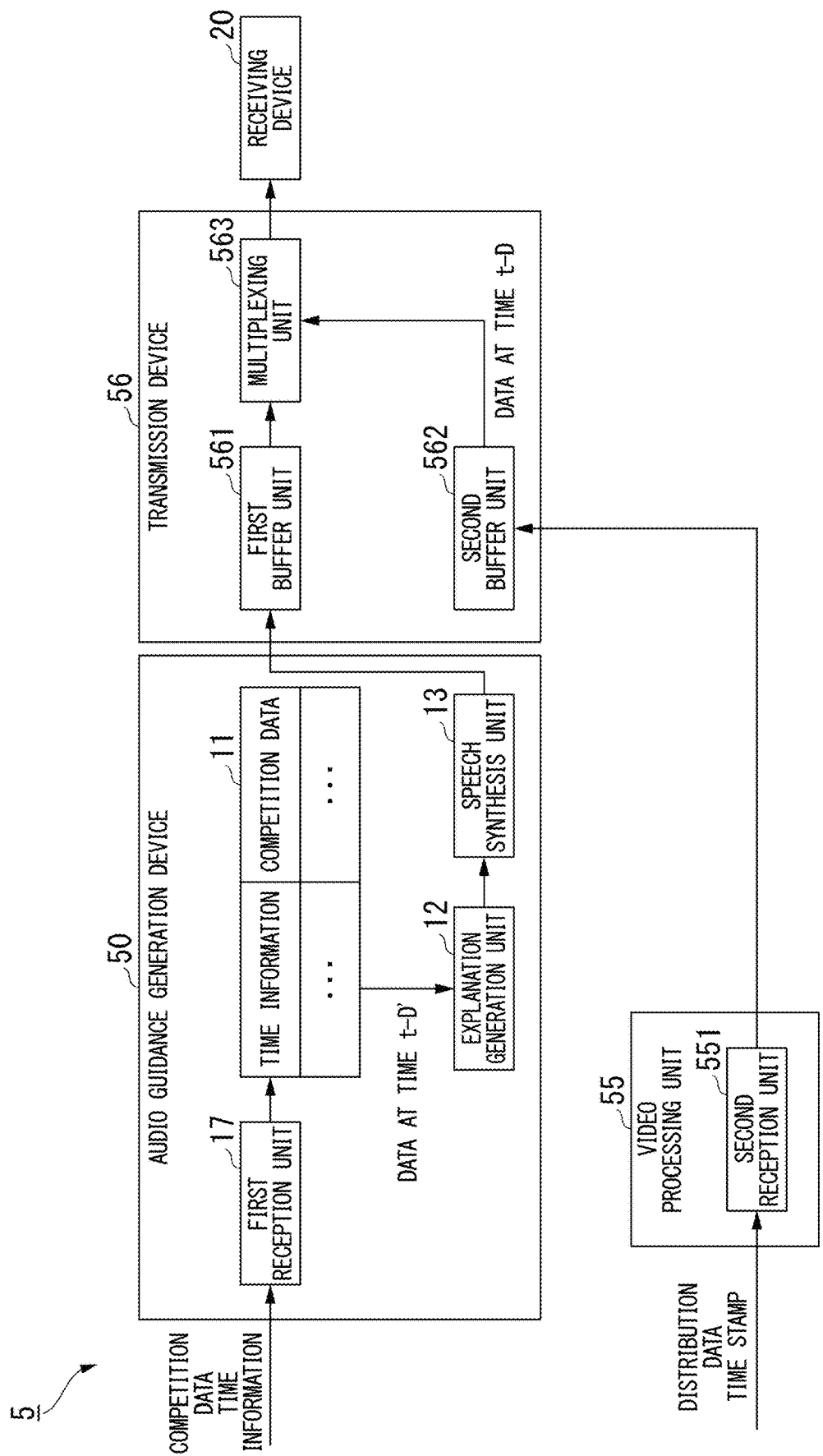
FIG. 29 is a block diagram illustrating a configuration example of an audio guidance generation device according to a third embodiment.

Therefore, as illustrated in FIG. 29, the broadcasting system 5 according to the present embodiment includes an audio guidance generation device 50, a video processing unit 55, and a transmission device 56.

The audio guidance generation device 50 includes a message management unit 11, an explanation generation unit 12, a speech synthesis unit 13, and a first reception unit 17.

The transmission device 56 includes a first buffer unit 561, a second buffer unit 562, and a multiplexing unit 563. The first buffer unit 561 stores the audio description data and time information received sequentially from the audio guidance generation device 10 at each predetermined unit in association with each other. The predetermined unit is, for example, a frame having a predetermined time length (for example, 20 ms to 1 s), and may be a period equal to or less than the event occurrence interval. The time information is information on the time when the situation of the competition indicated by the competition data used by the explanation generation unit 12 for generating the explanation text as the unconveyed information has occurred. Competition data is acquired in association with time information. The explanatory text is used by the speech synthesis unit 13 to generate audio description data after performing speech synthesis processing.

The second buffer unit 562 stores video data input from the video processing unit 55 and time information in association with each other. The video data is data indicating a video of the situation of the competition. The time information is information indicating the time when the situation occurs. The video data may be associated with original audio data indicating the audio of the situation of the competition and stored in the second buffer unit 562. In the following description, video data and original audio data are collectively referred to as a distribution stream.

The multiplexing unit 563 reads the audio description data at time t-D (hereinafter referred to as a designated time) which is a predetermined offset time D before the current time and the distribution stream at the time t-D from the first buffer unit 561 and the second buffer unit 562, respectively. In the multiplexing unit 563, an offset time D is set in advance. The offset time D may be a time longer than the required time from the reception of competition data to the start of transmission of audio description data in the audio guidance generation device 50. The multiplexing unit 563 multiplexing the read audio description data and the distribution stream to generate multiplexed data for distribution to the receiving device 20.

More specifically, when the original audio data is not included in the distribution stream and the video data is included, the multiplexing unit 563 multiplexes the audio description data and the video data to generate multiplexed data. When the original audio data is included in the distribution stream, the multiplexing unit 563 may mix the guidance audio indicated by the audio description data and the audio indicated by the original audio data. The multiplexing unit 563 generates multiplexed data by multiplexing the mixed audio data indicating the mixed audio obtained by the mixing and the video data included in the distribution stream. The multiplexing unit 563 transmits the generated multiplexed data to the broadcast transmission path or the communication transmission path.

The receiving device 20 receives the multiplexed data through the broadcast transmission path or the communication transmission path, and separates the received multiplexed data into video data and mixed audio data or audio description data. The receiving device 20 displays video based on the separated video data, and plays back audio based on the mixed audio data or audio description data.

The audio guidance generation device 10 further includes a first reception unit 17. The first reception unit 17 receives, for example, competition data indicating the latest situation of the competition and time information indicating the time when the situation has occurred, from the data center, and outputs it to the message management unit 11. The first reception unit 17 includes, for example, a communication interface.

The message management unit 11 stores the competition data input from the first reception unit 17 and the time information in association with each other. The time information may be described in the competition data. In that case, the first reception unit 17 does not receive time information separately from the competition data, and the message management unit 11 may extract the time information described in the competition data.

The message management unit 11 may further receive a synchronization signal indicating time information indicating the time from the transmission source data center through the first reception unit 17, and synchronize with the data center based on the received time information.

From the message management unit 11, the explanation generation unit 12 refers to the competition data at time t−D' which is the predetermined second offset time D' before the current time t, as unconveyed information, among the competition data accumulated in the message management unit 11. In the explanation generation unit 12, a second offset time D' is set in advance. The second offset time D' is a time larger than the standard fluctuation amount of the transmission time from the data center to the audio guidance generation device 10, and may be a positive value shorter than the first offset time D (0<D'<D). The explanation generation unit 12 uses the referenced competition data to generate an explanation text. In other words, it is desirable that the first offset time D is equal to or more than the time obtained by adding the maximum value of the time required for the explanation generation unit 12 to generate the explanatory text from the unconveyed information and the maximum value of the time required to generate the audio description data from the explanatory text to the second offset time D'. If the difference D−D' between the offset time D and the second offset time D' is less than the processing time Δ, which is the sum of the time required for generating the explanatory text and the time required for generating the audio description data, the multiplexing unit 563 may delay the distribution data by the time difference Δ−D+D' and multiplex it with the audio description data. In general, the time required for generating the explanatory text and the time required for generating the audio description data tend to increase as the explanatory text and the audio description data become longer. When the maximum value of the delay time allowed for the multiplexing unit 563 is set as the offset time D, in a case where the offset time D is less than the processing time Δ which is the sum of these times, the guidance audio based on the audio description data is delayed. In general, the shorter guidance audio tends to have quick response to its contents, and the longer guidance audio tends to have little quick response to its contents. Therefore, such a delay can be allowed even if it occurs temporarily.

The video processing unit 55 includes a second reception unit 551. The second reception unit 551 receives, for example, a delivery stream indicating a situation of the competition from a data center, and time information indicating a time when the situation has occurred, in a predetermined unit. The second reception unit 551 sequentially stores the received distribution stream and time information in association with each other in the second buffer unit 562 of the transmission device 56. The predetermined unit is, for example, a video frame. As the time information, for example, a time stamp indicating the time when the video is generated can be used. The predetermined unit may be a period equal to or shorter than the event occurrence interval. The second reception unit 551 includes, for example, a communication interface.

The first buffer unit 561 and the second buffer unit 562 may each be configured as a First-in First-out (FIFO) buffer. According to the configuration, in the first buffer unit 561, a first FIFO queue is formed as a time series of a set including audio description data and time information. In the second buffer unit 562, a second FIFO queue is formed as a time series of a set including distribution data and time information.

Next, the audio description distribution processing according to the present embodiment will be described.

Figure 30:
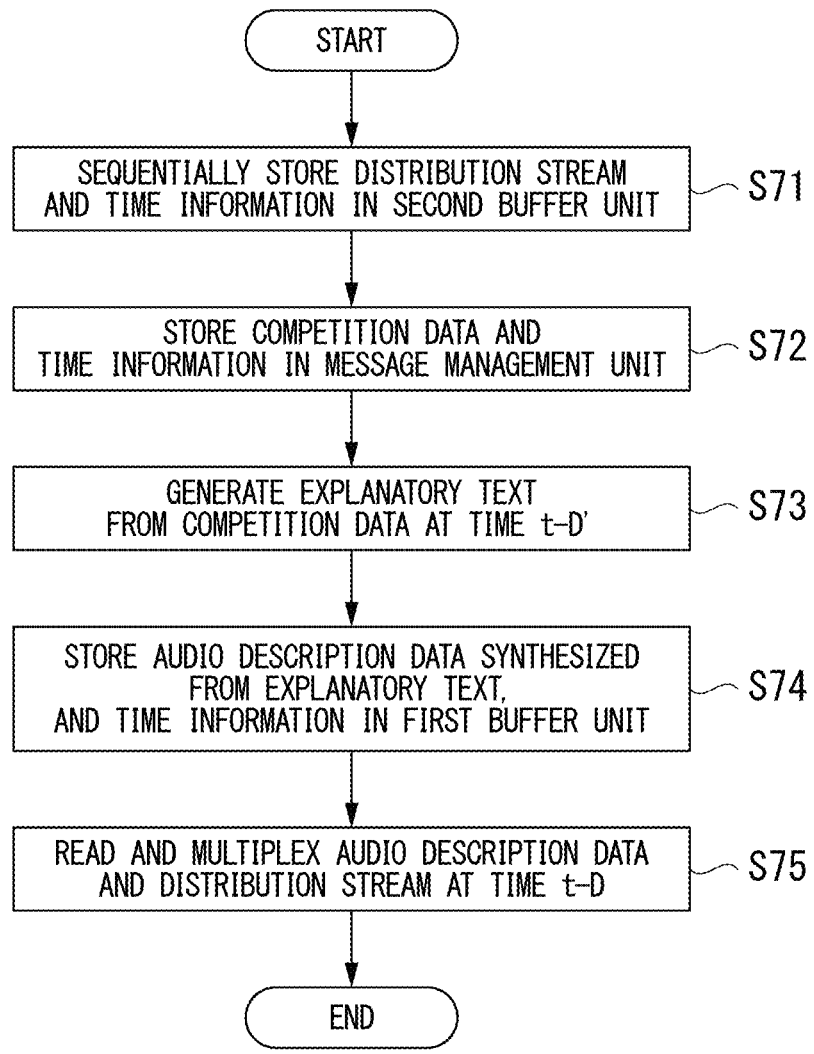
FIG. 30 is a flowchart illustrating an example of audio description distribution processing according to the third embodiment.

FIG. 30 is a flowchart illustrating an example of audio description distribution processing according to the present embodiment.

(Step S71) The second reception unit 551 receives the distribution stream indicating the situation of the competition, and time information, in predetermined units. The second reception unit 551 sequentially stores the received distribution stream and time information in association with each other in the second buffer unit 562 of the transmission device 56.

(Step S72) The first reception unit 17 receives competition data indicating the latest situation of the competition and time information indicating the time when the situation has occurred. The message management unit 11 stores the competition data and the time information, input from the first reception unit 17, in association with each other.

(Step S73) The explanation generation unit 12 refers to the competition data at time t−D which is the second offset time D' before the current time t, as unconveyed information, among the competition data accumulated in the message management unit 11, from the message management unit 11. The explanation generation unit 12 uses the referenced competition data to generate an explanatory text.

(Step S74) The speech synthesis unit 13 performs speech synthesis processing on the explanatory text generated by the explanation generation unit 12 to generate audio description data, and stores the generated audio description data in association with time information indicating the time related to the competition data used to generate the explanatory text, in the first buffer unit 561.

(Step S75) The multiplexing unit 563 reads the audio description data at the designated time t−D which is the first offset time D before the current time t from the first buffer unit 561, and reads the distribution stream at the designated time t−D from the second buffer unit 562. The multiplexing unit 563 generates multiplexed data by multiplexing the read audio description data and the distribution stream, and transmits the generated multiplexed data to the broadcast transmission path. Thereafter, the process of FIG. 30 is ended.

Modification Example

The distribution stream is not always transmitted in association with the time information. Therefore, the second buffer unit 562 may calculate the time t' indicating the situation of the competition indicated by the distribution stream by subtracting the delay time δ from the time t when the distribution stream is acquired. For example, the second buffer unit 562 receives the synchronization signal from the transmission source (for example, the data center) of the distribution stream through the second reception unit 551, and can measure the delay time δ by subtracting the time t1 indicated by the received synchronization signal from the current time t0. The second buffer unit 562 stores the acquired distribution stream in association with time information indicating the calculated time t'. Thus, when the transmission fluctuation from the transmission source to the audio guidance generation device 50 is so small that it can be ignored, the event represented by the distribution stream can be synchronized with the guidance audio indicated by the audio description data generated from the competition data.

The audio guidance generation device 50 may include a speech synthesis unit 34 (FIG. 13) instead of the speech synthesis unit 13.

As described above, according to the broadcasting system 5 according to the present embodiment, it is possible to synchronize and distribute the distribution data indicating a situation of the competition and the audio description data relating to the situation. Since fluctuations in the transmission delay of the competition data are absorbed, it is possible to more stably realize the synchronization between the audio description data generated based on the competition data and the distribution data.

As described above, embodiments of the invention have been described in detail with reference to drawings, but the specific configuration is not limited to the above-description, and various design changes and the like can be made without departing from the scope of the present invention.

For example, the audio guidance generation device 10, 30 may be integrated with one or both of the video processing unit 15 and the transmission device 16 and configured as a single audio guidance generation device 10, 30.

The audio guidance generation device 50 may be integrated with one or both of the video processing unit 55 and the transmission device 56 and configured as a single audio guidance generation device 50.

The broadcasting system 1, 5 may further include a server device (not shown) and may be configured as a broadcast communication cooperation system. In that case, the audio guidance generation device 10, 30, and 50 output the generated audio description data to the server device. The server device can transmit audio description data to the receiving device 20 connected through the communication transmission path. On the other hand, the receiving device 20 provides the function of the communication broadcast cooperation service by executing the process indicated by the command described in the application program. As a function of the receiving device 20, the receiving device 20 plays back audio based on the audio description data received from the server device.

The audio guidance generation device 10, 30 may not necessarily be a part of the broadcasting system 1. For example, the audio guidance generation device 10, 30 may output the audio description data to a server device connected to the communication transmission path. The server device may transmit the audio description data input from the audio guidance generation device 10, 30 and the video data of the competition in association with each other to various terminal devices connected to the communication transmission path. The server device may transmit the video data and the audio description data as a response to the reception of the distribution request signal from the terminal device, or may transmit all the data to the previously registered terminal devices.

The transmission device 56 of the broadcasting system 5 may transmit the generated multiplexed data to the communication transmission instead of with the broadcast transmission path or together with the broadcast transmission path.

The above-described audio guidance generation device 10, 30, and 50 may be configured as dedicated hardware or may be configured as hardware including a computer system therein. The operation procedures of a part of the audio guidance generation device 10, 30, 50 are stored in a computer-readable recording medium in the form of a program, and the above-described processes may be performed by the computer system reading and executing the program. The computer system here includes a processor such as a central processing unit (CPU), various memories, an operating system (OS), and hardware such as peripheral devices. Each functional unit described above may be configured by one or two or more computer systems, and a set of one functional unit or two or more functional units each may be configured by one computer system.

Further, "computer-readable recording medium" refers to a portable medium such as a flexible disk, a magneto-optical disk, a read only memory (ROM), and a compact disc (CD)-ROM, and a storage device such as a hard disk built in a computer system. The "computer-readable recording medium" may include a medium that dynamically holds a program for a short period of time, such as a communication line for transmitting a program through a network such as the Internet or a communication line such as a telephone line, and a medium that holds a program for a certain period of time, such as a volatile memory inside a computer system serving as a server or a client in that case. Further, the program may be intended to realize a part of the above-described functions, and may be intended to realize the above-described functions by combining them with the program already recorded in the computer system.

REFERENCE SIGNS LIST

1, 5: broadcasting system,
10, 30, 50: audio guidance generation device,
11: message management unit,
12: explanation generation unit,
13, 34: speech synthesis unit,
15, 55: video processing unit,
16, 56: transmission device,
17: first reception unit,
20: receiving device,
31: pre-learning unit,
32: corpus input unit,
33: model learning unit,
34: speech synthesis unit,
331: text analysis unit,
331*a*: phoneme language feature generation unit,
331*b*: frame language feature generation unit,
332: audio analysis unit,
332*a*: phoneme separator,
332*b*: acoustic feature generation unit,
333: DNN learning unit,
333*a*: time length model learning unit,
333*b*: acoustic feature model learning unit,
341: synthesized speech generation unit,
342: style analysis unit,
343: text analysis unit,
343*a*: phoneme language feature generation unit,
343*b*: frame language feature generation unit,
344: DNN calculation unit,
344*a*: time length calculation unit,
344*b*: acoustic feature calculation unit,
345: synthesis unit,
346: model storage unit,
346*a*: time length model time,
346*b*: acoustic feature model,
551: second reception unit,
561: first buffer unit,
562: second buffer unit,
563: multiplexing unit

The invention claimed is:

1. An audio guidance generation device, that is coupled to a transmission device, comprising:
   a message management circuitry that receives and accumulates a message, wherein the message is distributed for every update, the message being data representing a latest situation of a competition;
   an explanation generation circuitry that detects unconveyed information from the message with references to conveyed information, and generates an explanatory text for conveying the unconveyed information; and
   a speech synthesis circuitry that outputs, to the transmission device, a speech converted from the explanatory text,
   wherein the transmission device broadcasts multiplexed data by transmitting to a broadcast transmission path, the broadcast transmission path comprises a broadcast wave, and the multiplexed data comprises audio description data of the speech,
   wherein the explanation generation circuitry adds a predetermined information element in the unconveyed information to be conveyed again after a predetermined period from detection of a pattern of the unconveyed information, in a case when the pattern of the unconveyed information comprises designated information for the predetermined information element, wherein the predetermined information element is a pre-designated part of the message as a blank, and indicates a sentence pattern of an explanation text for explaining the predetermined information element, monitors output state of the speech to wait for completion of the output of the speech, stores the unconveyed information for the explanatory text to update the conveyed information upon completion of the speech, and initiates a procedure for generating a new explanatory text based on updated unconveyed information.

2. The audio guidance generation device according to claim 1, wherein the message management circuitry detects a modified portion of the message due to update of the message, generates new information according to a type of the varied part, and further accumulates the generated new information.

3. The audio guidance generation device according to claim 2, wherein the message management circuitry selects an information generation template corresponding to the type of the modified portion out of prestored information generation templates, each of the prestored information generation templates indicating a structure of the new information for each type of the modified portion, and generates the new information by integrating elements of the varied part into the selected information generation template.

4. The audio guidance generation device according to claim 1, wherein the explanation generation circuitry selects an explanatory template corresponding to the type of the unconveyed information out of prestored explanatory templates, each of the prestored explanatory templates indicating a sentence pattern of the explanatory text for each type of unconveyed information, and generates the explanatory text by integrating elements of the unconveyed information into the selected explanatory template.

5. The audio guidance generation device according to claim 1, wherein the explanation generation circuitry uses a text template in which a stressed portion is predetermined for the competition data indicating a situation of the competition indicated by the message to generate the explanatory text indicating the stressed portion from the competition data, wherein the speech synthesis circuitry comprises a phoneme language feature generation circuitry that analyzes the explanatory text to generate a language feature for each phoneme and stressed intonation information for the phoneme;

a time length calculation circuitry that generates a time length of the phoneme from the language feature and the stressed intonation information generated by the phoneme language feature generation circuitry, using a time length model;

a frame language feature generation circuitry that generates a language feature for each frame of the phoneme from the time length of the phoneme generated by the time length calculation circuitry and the language feature of the phoneme, and associates the generated language feature with the stressed intonation information of the phoneme corresponding to the frame;

an acoustic feature calculation circuitry that generates an acoustic feature for each frame, from the language feature of the frame generated by the frame language feature generation circuitry and the stressed intonation information corresponding to the frame, using an acoustic feature model; and a synthesis circuitry that synthesizes speech using the acoustic feature for each frame generated by the acoustic feature calculation circuitry, wherein the time length model is preliminarily learned, using the language feature for each phoneme, and stressed intonation information indicating presence or absence of stressed intonation for the phoneme as an input, and the time length of the phoneme as an output, and wherein the acoustic feature model is preliminarily learned, using the language feature for each frame of the phoneme and stressed intonation information indicating presence or absence of stressed intonation of the frame as an input, and the time length of the phoneme as an output, and an acoustic feature of the frame as an output.

6. The audio guidance generation device according to claim 5, wherein the time length model and the acoustic feature model are each learned further using sentence ending information indicating whether the phoneme is a phoneme of a sentence ending word having a part of speech as a noun, wherein the phoneme language feature generation circuitry generates the sentence ending information for each phoneme, based on the part of speech of the sentence ending word of the text, wherein the time length calculation circuitry generates a time length of the phoneme, by using the time length model, from the language feature of the phoneme, the stressed intonation information, and the sentence ending information, wherein the frame language feature generation circuitry associates the language feature for each frame with the sentence ending information, and wherein the acoustic feature calculation circuitry generates an acoustic feature for each frame, by using the acoustic feature model, from the language feature of the frame, and the stressed intonation information and the sentence ending information corresponding to the frame.

7. A broadcasting system comprising:

the audio guidance generation device according to claim 1;

a first buffer that stores audio data indicating the speech converted by the speech synthesis circuitry and time information indicating the time of a situation of the competition used to generate the explanatory text;

a second buffer that stores video data indicating the situation of the competition in association with time information indicating the time of the situation; and a multiplexer that extracts audio data at a designated time from the first buffer, the designated time being a first predetermined duration earlier than a current time, extracts video data at the designated time from the second buffer, and multiplexes the audio data and the video data.

8. The broadcasting system according to claim 7,
wherein the message management circuitry stores the competition data including the message in association with time information indicating the time of the situation of the competition indicated by the message,
wherein the explanation generation circuitry refers to the competition data at a time as unconveyed information from the message management circuitry, the time being a second predetermined duration earlier than the current time, and
wherein the second predetermined duration is shorter than the first predetermined duration.

9. An audio guidance generation method of an audio guidance generation device, that is coupled to a transmission device, the method comprising:
- a message management step of receiving and accumulating a message, wherein the message is distributed for every update, the message being data representing a latest situation of a competition;
- an explanation generation step of detecting unconveyed information from the message with reference to conveyed information, and generating an explanatory text for conveying the unconveyed information; and
- a speech synthesis step of outputting, to the transmission device, a speech converted from the explanatory text, wherein the transmission device broadcasts multiplexed data by transmitting to a broadcast transmission path, the broadcast transmission path comprises a broadcast wave, and the multiplexed data comprises audio description data of the speech, wherein the explanation generation step comprising a step of adding a predetermined information element in the unconveyed information to be conveyed again after a predetermined period from detection of a pattern of the unconveyed information, in a case when the pattern of the unconveyed information comprises designated information for the predetermined information element, wherein the predetermined information element is a pre-designated part of the message as a blank, and indicates a sentence pattern of an explanation text for explaining the predetermined information element, a step of monitoring output state of the speech to wait for completion of the output of the speech, a step of storing the unconveyed information for the explanatory text to update the conveyed information upon completion of the output speech, and a step of initiating a procedure for generating a new explanatory text based on updated unconveyed information.

* * * * *